US007495048B2

(12) United States Patent
Van den Bossche et al.

(10) Patent No.: US 7,495,048 B2
(45) Date of Patent: Feb. 24, 2009

(54) HEAT SEALABLE COMPOSITIONS AND USES THEREOF

(75) Inventors: Linda Maria Gisele Roberta Van den Bossche, Zwijndrecht (BE); Kenneth Lewtas, Tervuren (BE); Quoc Luvinh, Groot-Bijgarden (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 291 days.

(21) Appl. No.: 10/681,470

(22) Filed: Oct. 8, 2003

(65) Prior Publication Data

US 2004/0112533 A1   Jun. 17, 2004

Related U.S. Application Data

(60) Provisional application No. 60/417,319, filed on Oct. 9, 2002.

(51) Int. Cl.
   C08L 23/08   (2006.01)
   C08J 5/18    (2006.01)
   C08K 5/01    (2006.01)
   C08K 5/03    (2006.01)
   B32B 27/32   (2006.01)

(52) U.S. Cl. .................. 524/187; 524/270; 524/563; 524/77

(58) Field of Classification Search ................. 524/187, 524/270, 563, 77
   See application file for complete search history.

(56) References Cited

U.S. PATENT DOCUMENTS

| | | | |
|---|---|---|---|
| 3,558,399 A | 1/1971 | Turner | 156/308 |
| 3,625,727 A * | 12/1971 | Lightfoot et al. | 427/156 |
| 3,778,398 A | 12/1973 | Mestetsky | 260/28.5 R |
| 3,819,581 A | 6/1974 | Smith | 260/47 EN |
| 3,926,878 A | 12/1975 | Shimizu et al. | 260/27 EV |
| 3,933,691 A | 1/1976 | Lindemann | 260/2.5 L |
| 4,001,158 A | 1/1977 | Lindemann | 260/29.6 TA |
| 4,010,130 A | 3/1977 | Matsuo et al. | 260/28.5 AV |
| 4,020,228 A | 4/1977 | Eastes | 428/347 |
| 4,022,850 A | 5/1977 | Booth et al. | 260/897 B |
| 4,048,378 A | 9/1977 | Pelzek | 428/483 |
| 4,127,619 A | 11/1978 | Godfrey | 260/889 |
| 4,256,622 A | 3/1981 | Smith | 260/33.2 R |
| 4,287,034 A | 9/1981 | Pieslak et al. | 204/147 |
| 4,337,284 A | 6/1982 | Cooper et al. | 428/35 |
| 4,351,928 A | 9/1982 | Smith | 525/443 |
| 4,362,784 A | 12/1982 | Kato et al. | 428/340 |
| 4,366,662 A | 1/1983 | Katsura et al. | 53/478 |
| 4,452,835 A | 6/1984 | Vasudevan | 428/35 |
| 4,476,896 A | 10/1984 | Schirmer | 137/561 A |
| 4,477,501 A | 10/1984 | Kojima et al. | 428/35 |

(Continued)

FOREIGN PATENT DOCUMENTS

CA    1 011 034    5/1977    ................. 402/263

(Continued)

OTHER PUBLICATIONS

Abstract for JP58-47038 (Mar. 18, 1983).

(Continued)

*Primary Examiner*—Kelechi C Egwim

(57) ABSTRACT

Ethylene unsaturated ester copolymers combined with a resin are disclosed for use in the sealing layers of laminates and films.

9 Claims, 9 Drawing Sheets

U.S. PATENT DOCUMENTS

| | | | |
|---|---|---|---|
| 4,497,941 A * | 2/1985 | Aliani et al. | 526/331 |
| 4,585,682 A | 4/1986 | Colarusso et al. | 428/57 |
| 4,613,632 A | 9/1986 | Aliani et al. | 523/172 |
| 4,632,784 A | 12/1986 | Baggiolini et al. | 260/397.2 |
| 4,670,349 A | 6/1987 | Nakagawa et al. | 428/516 |
| 4,710,190 A | 12/1987 | Wood et al. | 604/389 |
| 4,731,282 A | 3/1988 | Tsukagoshi et al. | 428/220 |
| 4,741,957 A | 5/1988 | Park | 428/349 |
| 4,801,485 A | 1/1989 | Sallee et al. | 428/198 |
| 4,846,827 A | 7/1989 | Sallee et al. | 604/385.2 |
| 4,852,754 A | 8/1989 | Holdsworth et al. | 215/347 |
| 4,921,749 A | 5/1990 | Bossaert et al. | 428/216 |
| 4,981,734 A | 1/1991 | Akao et al. | 428/35.9 |
| 4,988,467 A | 1/1991 | Holdsworth et al. | 264/46.6 |
| 5,024,887 A | 6/1991 | Yamane | 428/335 |
| 5,075,156 A | 12/1991 | Tanaka et al. | 428/212 |
| 5,100,721 A | 3/1992 | Akao | 428/218 |
| 5,128,397 A | 7/1992 | Horsey et al. | 524/290 |
| 5,141,809 A | 8/1992 | Arvedson et al. | 428/349 |
| 5,154,981 A | 10/1992 | Brant et al. | 428/520 |
| RE34,122 E | 11/1992 | Sheehan et al. | 156/327 |
| 5,178,960 A | 1/1993 | Cook | 428/461 |
| 5,183,706 A | 2/1993 | Bekele | 428/349 |
| 5,185,203 A * | 2/1993 | Itaba et al. | 428/349 |
| 5,215,809 A | 6/1993 | Hoso et al. | 428/193 |
| 5,217,812 A | 6/1993 | Lee | 428/461 |
| 5,300,353 A | 4/1994 | Yoshimura et al. | 428/213 |
| 5,340,649 A | 8/1994 | Roeker et al. | 428/344 |
| 5,362,792 A | 11/1994 | Maayeh | 524/491 |
| 5,373,049 A | 12/1994 | Ornstern et al. | 524/487 |
| 5,512,124 A | 4/1996 | Hansen | 156/334 |
| 5,530,065 A | 6/1996 | Farley et al. | 525/240 |
| 5,541,246 A | 7/1996 | Dandreaux et al. | 524/272 |
| 5,643,676 A | 7/1997 | Dobashi et al. | 428/411.1 |
| 5,703,153 A | 12/1997 | Maayeh | 524/499 |
| 5,766,714 A | 6/1998 | Profetto et al. | 428/40.1 |
| 5,895,714 A | 4/1999 | Malek | 428/337 |
| 6,017,998 A | 1/2000 | Duan et al. | 524/591 |
| 6,060,425 A | 5/2000 | Morohoshi et al. | 503/200 |
| 6,063,462 A | 5/2000 | Tsukamoto et al. | 428/36.7 |
| 6,094,889 A | 8/2000 | Van Loon et al. | 53/450 |
| 6,225,520 B1 | 5/2001 | Bauduin et al. | 602/52 |
| 6,376,095 B1 | 4/2002 | Cheung et al. | 428/516 |

FOREIGN PATENT DOCUMENTS

| | | |
|---|---|---|
| EP | 0078122 | 5/1983 |
| EP | 0 281 694 A1 | 9/1988 |
| EP | 0 078 122 B1 | 1/1989 |
| EP | 0 301 867 A2 | 2/1989 |
| EP | 0 301 867 A3 | 2/1989 |
| EP | 0 340 990 A2 | 11/1989 |
| EP | 0 147 088 B1 | 5/1990 |
| EP | 0 369 705 A2 | 5/1990 |
| EP | 0369705 | 5/1990 |
| EP | 0 247 898 B1 | 11/1990 |
| EP | 0 353 224 B1 | 1/1991 |
| EP | 0 188 901 B1 | 6/1991 |
| EP | 0 247 896 B1 | 6/1991 |
| EP | 0 263 882 B1 | 10/1991 |
| EP | 0 299 884 B1 | 12/1991 |
| EP | 0 299 844 B1 | 5/1993 |
| EP | 0 592 913 B1 | 4/1994 |
| EP | 0 424 761 B1 | 7/1994 |
| EP | 0 622 430 B2 | 11/1994 |
| EP | 0 761 315 B1 | 3/1997 |
| EP | 0 826 754 A2 | 3/1998 |
| EP | 0 826 754 A3 | 3/1998 |
| EP | 0 679 685 B1 | 9/1998 |
| EP | 0 827 526 B1 | 8/1999 |
| EP | 0 608 175 B1 | 11/1999 |
| EP | 0 957 147 | 11/1999 |
| FR | 2 600 981 A3 | 1/1988 |
| FR | 2 807 442 A1 | 10/2001 |
| FR | 2 807 443 A1 | 10/2001 |
| GB | 1 049 033 | 11/1966 |
| GB | 1377206 | 12/1974 |
| GB | 1 401 880 | 8/1975 |
| GB | 2 138 008 A | 10/1984 |
| GB | 2138008 | 10/1984 |
| GB | 2 277 479 A | 11/1994 |
| JP | 51114480 | 10/1976 |
| JP | 58-47038 | 3/1983 |
| JP | HEI 4(1992)239081 | 8/1992 |
| JP | 09227840 | 9/1997 |
| JP | 02222479 | 8/2002 |
| WO | WO 87/07216 | 12/1987 |
| WO | WO 91/06609 | 5/1991 |
| WO | WO 94/19414 | 9/1994 |
| WO | WO 98/37139 | 8/1998 |
| WO | WO 98/37140 | 8/1998 |
| WO | WO 98/37141 | 8/1998 |
| WO | WO 98/37142 | 8/1998 |
| WO | WO 98/37143 | 8/1998 |
| WO | WO 00/00657 | 2/2000 |
| WO | WO 00/78859 | 12/2000 |
| WO | WO 02/18510 | 8/2001 |
| WO | WO 02/36703 | 5/2002 |
| WO | WO 03/039860 | 5/2003 |

OTHER PUBLICATIONS

Abstract for JP51114480 (Oct. 8, 1976).

Abstract, EP 0 299 844, "Visual intensity restrictor for cataract sufferers—scans field of view using electronic shutter so that instantaneous receipt of light is confined to small area of eye", (Jan. 18, 1989).

Abstract, EP 0 299 884, "Flexible self-adhesive film for temporary protection", (Jan. 18, 1989).

Abstract, EP 0 424 762, "High-gloss multilayer films and their hot lamination", (May 2, 1991).

Abstract, EP 0 592 913, "Films of copolymers of alpha-olefins and unsaturated polar monomers for protecting automobile surfaces", (Apr. 20, 1994).

Abstract, EP 0 608 175, "Pressure-sensitive adhesive-coated films for protection of surfaces of plastic moldings", (Jul. 27, 1994).

Abstract, EP 0 622,430 (DE 4 313 542), "Ethylene-vinyl acetate copolymer film for lamination of nonmetallic substrates", (Nov. 2, 1994).

Abstract, EP 0 761 315 (DE 1 953 2220), "Self-adhesive protective film", (Mar. 6, 1997).

Abstract, EP 0 826 754 (DE 1 963 5704), "Self-adhesive protective plastic film", (Mar. 5, 1998).

Abstract, FR 260 0981, "Flexible adhesive tape for temporary protection of fragile surfaces and manufacturing method", (Jan. 8, 1988).

Abstract, FR 280 7442, "Paraffin-free EVA-based hot-melt adhesive for fabricating thermo-sealable products in molds", (Oct. 12, 2001).

Abstract, FR 280 7443, "Paraffin-free EVA-based hot-melt adhesive for fabricating thermo-sealable products in molds", (Oct. 12, 2001).

Abstract ZA 6803092, "Extrusion-coating of ethylene-vinyl acetate copolymer coatings", B.W. Elliott, (Nov. 12, 1968).

Abstract, BE 808488, "Self-adhesive, transparent packaging film—consisting of mixture of ethylene/vinyl ester copolymer and hydrocarbon resin, polybutene or polyisobutene", (Dec. 14, 1972).

Abstract, DE 2549612, "Hydrocarbon resins", (Nov. 5, 1975).

Abstract, FR 1573940, "Adhesives for soil facing", (Jul. 11, 1969).

Abstract, EP 884173, "Oxygen-absorbing multilayer film and oxygen-absorbing packaging container therefrom with concealed deoxidizing agent discoloration", (Jun. 12, 1998).

Abstract, EP 830953, "Multilayered thermal-transfer medium from water-based formulation", (Sep. 22, 1997).

Abstract, EP 810087, "Heat-shrinkable multilayer films having excellent sealing properties for use as vacuum shrink packages and food packages", (May 28, 1997).

Abstract, EP 803559, "Hot-melt adhesive compositions containing ethylene-.alpha.-olefin copolymer and carboxylated polyethylene for packaging", (Apr. 23, 1997).
Abstract, EP 679685, "Ethylene copolymer composition for extruded sheet and film", (Apr. 25, 1995).
Abstract, EP 445955, "Ethylene polymer blends for heat sealable packaging films", (Feb. 27, 1991).
Abstract, EP 312288, "Manufacture of heat-sealable polyolefin films", (Oct. 11, 1988).
Abstract, EP 240253, "Resin Emulsions", (Mar. 26, 1987).
Abstract, EP 129310, "Sealing gaskets, and container closures incorporating them", (Apr. 18, 1984).
Abstract, JP 01113241, "Multilayer Sheet for Light-Weight Container", (May 1, 1989).
Abstract, JP 0145775, "Peelable Surface Protective Film", (Aug. 30, 1983).
Abstract, JP 0198383, "Surface Protecting Film", (Jul. 17, 1992).
Abstract, JP 02198841, "Heat-Sealing Cover Material", (Aug. 7, 1990).
Abstract, JP 03020382, "Hot-Melt Adhesive Composition", (Jan. 29, 1991).
Abstract, JP 04239080, "Self-adhesive tape and its manufacture", (Aug. 26, 1992).
Abstract, JP 04239081, "Surface Protective Film", (Aug. 26, 1992).
Abstract, JP 06345911, "Resin Composition for Print Laminate", (Dec. 20, 1994).
Abstract, JP 08060111, "Surface-Protective Film", (Mar. 5, 1996).
Abstract, JP 08325338, "Tackifying Agent for Ethylenic Copolymer and its Adhesive Composition", (Dec. 10, 1996).
Abstract, JP 10158593, "Thermoplastic Film Resin", (Jun. 16, 1998).
Abstract, JP 10219215, "Hot Melt Adhesive Composition", (Aug. 18, 1998).
Abstract, JP 11020097, "Sealing Film for Electronic Device", (Jan. 26, 1999).
Abstract, JP 2001 207145, "Hot-Melt Adhesive Composition", (Jul. 31, 2001).
Abstract, JP 54160482, "Coated polyethylene films for covering metals", (Jun. 9, 1978).
Abstract, JP 54046282, "Surface Protective Film", (Apr. 12, 1979).
Abstract, JP 50034048, Ethylene-vinyl Acetate Copolymer Packaging Films, (Jul. 26, 1973).
Abstract, JP 50123139, "Resin Adhesives for Polyolefin Resins", (Mar. 18, 1974).
Abstract, JP 52015094, "Assembly and Transfer Apparatus of Ship Body Block", (Feb. 4, 1977).
Abstract, JP 53112983, "Laminated Film", (Oct. 2, 1978).
Abstract, JP 54119535, "Heat-Active Adhesive Composition Capable of Extrusion Coating", (Sep. 17, 1979).
Abstract, JP 55084659, "Films for heat-seal", (Dec. 22, 1978).
Abstract, JP 56049264, "Heat-shrinkable laminated films", (Sep. 27, 1979).
Abstract, JP 57008234, "Heat-Sealable Resin Composition", (Jan. 16, 1982).
Abstract, JP 57158276, "Hot-Melt Adhesive Composition", (Sep. 30, 1982).
Abstract, JP 58015545, "Heat-Sealable Resin Composition", (Jan. 28, 1983).
Abstract, JP 61183371, "Heat-Sealable Resin Composition", (Aug. 16, 1986).
Abstract, JP 62149775, "Hot-Melt Adhesive", (Jul. 3, 1987).
Abstract, JP 51114480, "A Method for Manufacturing a Laminate", (Oct. 8, 1976).
Abstract, JP 52073987, "Laminates", (Jun. 21, 1977).
Abstract, JP 53069792, "Easily Separable Material for Package", (Jun. 21, 1978).
Abstract, JP 58051130, "Polyethylene-coated Steel Pipe", (Mar. 25, 1983).
Abstract, JP 59050295, "Plastics coated tubes for e.g. underground pipelines—using compsn. Contg. Crosslinked and non-crosslinked polyolefin resins, colourant, carbon black UV absorber, antioxidant, etc." (Aug. 31, 1988).
Abstract, JP 63003743, "Vinyl copolymers for heat-sealable lids", (Oct. 31, 1979).
Abstract, JP 9207280, "Heat-Resistant Protective Film", (Aug. 12, 1997).
Abstract, JP Kokai (A) 2-222479, "Adhesive", (Sep. 5, 1990).
Abstract, JP Kokai (A) 54-160482, "Laminated Film", (Dec. 19, 1979).
Abstract, JP 2001081420, "Hot-tack pressure-sensitive adhesive sheets", (Mar. 27, 2001).
Abstract, JP 2000052526, "Decorative sheets for furnitures and building interiors", (Aug. 7, 1998).
Abstract, JP 11138720, "Low-temperature sealable composite films with high heat seal strength and good hot tack properties", (Nov. 11, 1997).
Abstract, JP10120841, "Polyethylene-type resin compositions for extrusion lamination and their extruded laminates with improved heat sealability at low temperature", (Oct. 18, 1996).
Abstract, JP 09327888, "Paper laminates and their packagings for liquids", (Jun. 11, 1996).
Abstract, JP 09277449, "Thermosetting resin laminate decorative materials for furnitures and building materials and their manufacture", (Apr. 16, 1996).
Abstract, JP 08003384, "Ethylenic resin compositions for food packaging films", (Jun. 24, 1994).
Abstract, JP 05043752, "Hot tack and heating sealing properties of EVOH", (Aug. 9, 1991).
Abstract, JP 01268742, "Resin compositions for high-speed extrusion molding and method of laminating", (Apr. 19, 1988).
Abstract, JP 60044540, "Linear low-density polyethylene resin compositions", (Aug. 19, 1983).
Abstract, JP 59179643, "Composition for extrusion molding", (Mar. 31, 1983).
Abstract, JP 59066437, "Resin compositions for films", (Oct. 8, 1982).
Abstract, JP 58037037, "Polyethylene blends with good extrusion processability", (Aug. 28, 1981).
Abstract, JP 58001558, "Laminated packaging films with good processability", (Jun. 26, 1981).
Abstract, JP 11070505, "Scratch-resistant decorative wood materials laminated with plastic composite films with good surface appearance and bendability and manufacture thereof", (May 21, 1998).
Abstract, JP 10071660, "Hot-melt adhesives-containing disposable products with excellent water absorbing properties", (Apr. 11, 1997).
Abstract, JP 09104727, "Vinyl acetate-grafted hydrocarbon resins as tackifiers for hot-melt adhesives", (Oct. 9, 1995).
Abstract, JP 06345911, "Resin compositions for lamination on printed materials", (Jun. 11, 1993).
Abstract, JP 05117628, "Moldable sealants for use in automobiles", (Oct. 31, 1991).
Abstract, JP 02150386, "Heat-sensitive transfer printing inks", (Dec. 1, 1988).
Abstract, JP 62263203, "Hydrocarbon resins as additives for adhesives", (May 12, 1986).
Abstract, JP 62149775, "Hot-melt adhesives", (Dec. 16, 1985).
Abstract, JP 57158276, "Hot-melt adhesive compositions", (Mar. 26, 1981).
Abstract, JP 57008234, "Heat-sealable resin compositions", (Jun. 17, 1980).
Abstract, JP 56028257, "Hot-melt adhesive compositions", (Aug. 15, 1979).
Abstract, JP 52015094, "Heat-sealable polyester film laminates", (Jul. 30, 1973).
Abstract, JP 51114480, "Heat-sealable plastic laminates", (Apr. 1, 1975).
Abstract, JP 50119034, "Hot-melt adhesives", (Mar. 5, 1974).
Abstract, JP 61162539, "Modified polyolefin compsn. for adhesion—comprises ethylene-alpha-olefin random copolymer, tackifier and modified polyethylene", (Sep. 22, 1993).
Abstract, JP 55079268, "Laminated packaging material—comprising substrate, and resin layer comprising EVA copolymer and polymer of ethylene or alpha-olefin with unsatd. carboxylic acid", (Sep. 2, 1993).
Abstract, JP 2001207145, "Hotmelt adhesive composition that contains EVA resin, tackifier resin, and wax, exhibits excellent basic adhesive properties like dry adhesion strength and thermal stability, and can be suitably applied for paper packaging", (Oct. 18, 2001).

Abstract, JP 48001823, "Coating composition for heat-sticking", (Jan. 20, 1973).

Abstract, JP 58047038, "Heat sealing resin compsn.—comprising ethylene-vinyl ester copolymers, low or non-crystalline ethylene-propylene or-butene -1 copolymer and tackifier", (Mar. 18, 1983).

Abstract, JP 51090342, "Improving softening pts. of hot melt compsn.—comprising copolymer of ethylene and vinyl acetate", (Aug. 7, 1976).

Abstract, Shekhar, A., "A model for hot tack behavior in ethylene acid copolymer films", E.I. DuPont De Nemours and Co., Inc., Orange, TX; Tappi J. (1994), 77(1), pp. 97-104.

Abstract, Foster, B.W., "What happens when you drool?", Eastman Chemical Company, Longview, TX., Polym., Laminations Coating Conference (1996), vol. 1, pp. 145-165; TAPPI Press, Atlanta, GA.

Abstract, Patel, R.M. et al., "Comparison of EVA and polyolefin plastomer as a blend component in various films applications", Polyolefins Research, The Dow Chemical Company, Freeport, TX; Polym., Laminations, Coat. Conf. (1997), vol. 1, pp. 239-242, (TAPPI Press, Atlanta, GA.).

Abstract, Sierra, J.D. et al., "Effect of metallocene Polyethylene on heat sealing properties of low density polyethylene blends", Instituto de Capacitacion e Investigacion del Plastico y del Caucho, Colombia, USA; Annu. Tech. Conf.—Soc. Plast. Eng (1999), 57th (vol. 2), pp. 2056-2060.

Abstract, Campbell, R.N., "Polypropylene film comparisons from sequential and simultaneous tenter BOPP processes", UNIPOL PP Division, Union Carbide Corporation, Houston, TX; TAPPI Polym., Laminatios Coat. Conf. (1999), vol. 2, pp. 753-767, (TAPPI Press, Atlanta, GA.).

Abstract, Vansant, J.D., "The effect of coextrusion on the hot-tack performance of a common ionomer resin", Chestnut Run Laboratories Packaging & Industrial Polymers, DuPont Company, Wilmington, DE; Polym., Laminations Coat. Conf. (1998), vol. 2, pp. 743-754 (TAPPI Press, Atlanta, GA.).

de Garavilla, J.R., "Ionomer, acid copolymer, and metallocene polyethylene resins: A comparative assessment of sealant performance", vol. 78, No. 6, Tappi Journal, pp. 191-203 (Jun. 1995).

Duncan et al., "EVA and VAE Copolymers for Hot Melt PSA's", Adhesives Age, (Mar. 1980), pp. 37-41.

McDonald, J.W., et al., "Factors Affecting Hot Tack in Hot Melt Systems Containing Ethylene Interpolymers", Tappi Journal, vol. 51, No. 7, pp. 46A-50A (Jul. 1968).

Rapra Abstract, "Eastman Builds in Polyolefins; Plans entry into LLDPE, HDPE Lists", Modern Plastics International 19, No. 9, (Sep. 1989), pp. 32-36.

Schmidt, et al., "Coatings & Laminates of Improved Ethylene Alkyl Acrylate Copolymer With Polypropylene and Polyester", TAPPI Proceedings, 1997 Polymers, Laminations & Coatings Conference, vol. 2, pp. 397-415.

Wooster, J.J., "New Resins for Fresh-Cut Produce Packaging", Journal of Plastic Film & Sheeting, vol. 14, (Jan. 1998), pp. 76-89.

Rapra Abstract, "Hydrogenated Tackifiers", Modern Plastics International 27, No. 8, (Aug. 1997), pp. 122.

Rapra Abstract, "Elvax 40 and 150 high vinyl acetate resins . . . specialty blending resins for adhesives, sealants and coatings", Du Pont de Nemours International SA, Geneva, c. 1989, pp. 8 (Feb. 28, 1989).

* cited by examiner

HEAT SEALABLE COMPOSITIONS AND USES THEREOF

CROSS REFERENCE TO RELATED APPLICATIONS

This application claims the benefit of Provisional Application No. 60/417,319 filed Oct. 9, 2002, the disclosure of which is incorporated by reference in its entirety.

BACKGROUND

The present invention relates to heat-sealable compositions for use in films and laminates. In particular, the invention relates to combinations of ethylene-unsaturated ester copolymer and resin. The combinations exhibit excellent heat sealing and other physical properties without degrading processability and may be used to manufacture a variety of items including laminated objects and other articles employing a heat seal.

Many articles of manufacture are sealed within a protective coating. Some of these coatings are heat-sealed and some are thermally laminated. The heat seals are generally formed by welding two separate portions of the coating or layer (generally either a film or a laminate) together. The sealing layers may form part of a mono- or multi-layer film or laminate, which may or may not comprise additional components and/or additives.

There are several important characteristics of a good heat-sealable polymer. Two important characteristics are the seal initiation temperature (SIT) and maximum seal strength temperature (MSST), which are generally defined by viewing a hot tack strength curve. SIT is the minimum temperature required to develop an acceptable strength of the heat seals. In many cases, the acceptable hot tack strength is equal to or greater than 0.7 N/cm and may depend on the choice of materials and desired minimum hot tack strength.

MSST is the temperature at which the hot tack strength reaches the maximum level, and more importantly, the failure mode is tearing or inseparable bond formation. Thus, heat-sealing temperatures above the seal initiation temperature result in heat seals with considerable and measurable seal strength. Lower heat seal initiation temperatures are desirable during commercial production. Lower temperatures allow higher production rates because the polymer(s) need not be heated to as great a temperature to make the seal(s).

One of the limiting factors controlling the productivity (number of packages/unit time) in commercial packaging lines using heat sealing techniques is the time required to transfer heat to the interface, melt the sealing layers, and cool down, thereby achieving a desired temperature for sealing. Lower SITs and MSSTs require shorter times to transfer the heat to the interface for sealing the surfaces. Also, cooling of the seal to attain adequate strength will be faster. Qualitatively, every 10° C. decrease in the SIT and/or the MSST may result in 30% improvement in the productivity. For applications requiring inseparable bond formation or tearing failure mode, the sealing is usually conducted at temperatures well above the SIT or near the MSST. At these temperatures the polymers are often molten. However, there may be applications where lower seal strength is desirable and peeling or peeling and tearing is required. In such cases, the sealing may be conducted between the SIT and the MSST, and productivity may be significantly increased if good sealing performances are obtained at temperatures closer to the SIT.

A third important sealing characteristic is the cohesive strength during the cooling stage before solidification of a heat seal. Immediately after each seal is formed and as it cools, the sample can be torn apart, and the strength of the seal is measured—this strength is known as hot tack strength. Increased hot tack strength is generally preferred in most applications, particularly in vertical form fill and seal packaging lines.

A fourth important characteristic is the hot tack strength plateau (HTP), which is the range of temperatures acceptable for forming a seal of suitable strength before the sealing polymer cools. The HTP determines the acceptable range of operating temperatures and conditions, such as packaging line speed, where seal strength remains essentially constant or above a certain predetermined value set by the end use application. The acceptable range of operating temperatures depends on the polymers being used. If the operating temperature is too high, the molten polymer does not have time to cool and develop cohesive strength, and the hot tack strength begins to decrease. It is often difficult or impossible to maintain commercial sealing equipment at exactly the same temperature throughout a commercial sealing run. Thus, a broader hot tack strength plateau makes it easier to operate within a given temperature range to ensure that all heat seals made will have acceptable strength. In many cases, the processors determine a predetermined minimum hot tack strength value and operate the sealing equipment at temperatures that will achieve the predetermined minimum hot tack strength value.

The interplay between these sealing characteristics is important to manufacturers, especially in laminate applications. A low SIT allows a manufacturer to use less heat and/or pressure to form a seal, thereby achieving faster production and increased energy savings. An increased hot tack strength yields stronger and more integral seals. A longer HTP provides a strong seal over an increased temperature range and improves process efficiency. Increased hot tack strength prevents the failure, or opening, of a seal at higher processing speeds. All of these in combination provide a manufacturer with the ability to increase line speed of a given process and to broaden the operating window. Manufacturers will benefit from increased production rates and the cost savings associated with operating a process with significantly lower temperatures. End user benefit with better seals in packages.

Various types of polymers are used to form articles that may be joined together or sealed by the application of heat and/or pressure. The polymers or combinations of polymers selected in the sealing layer of the films or laminates are chosen because they provide a strong integral seal (or in certain cases peelability). Occasionally, the sealing layer can form the entire film or may be part of a multilayer film and can be co-extruded with the same or different polymers.

In some applications, ethylene vinyl acetate (EVA) is used alone to form a heat-sealed film in co-extrusion and in laminates because it combines good processability in blown film processes (melt strength, bubble stability) and in extrusion coating processes (draw down, necking), the required compatability with the packed product, and a low melting point. However, EVA has limited thermal stability, which is generally a function of the vinyl acetate comonomer content. EVA copolymers have excellent sealing performances relative to seal strength and low seal initiation temperature. Unfortunately, EVA copolymers generally have relatively lower hot tack strength and narrower HTPs than other polymers such as ethylene acrylic acid (EAA) and ionomers. In vertical form fill and seal packaging lines, only a limited amount of EVA copolymers are used because of its decreased hot tack strength performance. To date, solving these problems has caused the degradation of one or more of the other desired properties. Therefore, a need exists for improvements in EVA copolymer laminate applications that exhibit improved heat sealing while maintaining other desirable physical properties.

There have been prior disclosures of ethylene unsaturated esters and resin combinations, for example, U.S. Pat. No. 4,497,941, U.S. Pat. No. 4,452,835, JP09227840, U.S. Pat. No. 3,625,727, JP Kokai (A) 58-47038, U.S. Pat. No. 5,362, 792, JP 51114480, and EP 78122. These disclosures, however, do not appear to recognize that a selection of compatible ethylene unsaturated esters and resins can yield improved processing characteristics, such as increased maximum hot tack strength, lower initial sealing temperatures, and/or extension of the hot tack plateau, while avoiding significant impairment of other key processing parameters.

Other background references include EP 0 369 705 A, GB 2 138 008 A, U.S. Pat. No. 6,376,095 B 1, and GB 1 377 206 A.

SUMMARY

The addition of a resin, preferably a low-molecular weight resin, maintains or improves the sealing performance of EVA copolymers and increases hot tack at lower temperatures, expands the hot tack strength plateau, and/or increases maximum hot tack strength. Key processing characteristics such as draw-down and neck-in during extrusion coating are not affected by the incorporation of the resin.

Accordingly, one embodiment of the present invention is a use of a resin in combination with an ethylene unsaturated ester copolymer in the sealing layer of a film or laminate to lower the sealing temperature of the sealing layer at least 3° C., more preferably at least 5° C., and more preferably at least 10° C., for a predetermined hot tack strength value when compared to the sealing temperature for the same ethylene unsaturated ester copolymer at the predetermined hot tack strength value.

Another embodiment is a use of a resin in combination with an ethylene unsaturated ester copolymer in the sealing layer of a film or laminate to extend the hot tack plateau at least 10° C. above the maximum seal strength temperature (MSST) for the ethylene unsaturated copolymer alone while maintaining a hot tack strength greater than 50%, more preferably at least 70%, of the value of the maximum hot tack strength value of the ethylene-unsaturated ester copolymer alone.

Another embodiment is a composition for use in the sealing layer of laminate to be applied to a substrate, the composition consisting essentially of a combination of ethylene-unsaturated ester copolymer and a resin, wherein during a heat sealing process, the sealing layer comprising the combination meets at least one of the following conditions: (i) at temperatures less than the maximum seal strength temperature (MSST) of the ethylene-unsaturated ester copolymer alone, the sealing temperature of the sealing layer is at least 3° C. below the sealing temperature of the ethylene-unsaturated ester copolymer alone for a predetermined hot tack value; (ii) at temperatures greater than 10° C. above the MSST of the ethylene-unsaturated ester copolymer alone, the hot tack strength of the sealing layer is greater than 50% of the value of the maximum hot tack strength of the ethylene-unsaturated ester copolymer alone; or (iii) the maximum hot tack of the sealing layer is greater than the maximum hot tack of the ethylene-unsaturated ester copolymer alone. Other embodiments include compositions that meet at least two or all three conditions.

Another embodiment is a process comprising pre-determining a sealing temperature for a given hot tack for a film or laminate having a sealing layer consisting essentially of an ethylene unsaturated ester copolymer, providing a film or laminate having a sealing layer comprising a hydrocarbon resin and the ethylene unsaturated ester copolymer, sealing the film or laminate at a temperature at least 3° C., more preferably at least 5° C., and more preferably at least 10° C. below the pre-determined sealing temperature. In such a process, the sealing layer may be formed by mixing ethylene unsaturated ester copolymer with a masterbatch comprising 10-90 wt % hydrocarbon resin and 90-10 wt % carrier polymer so that the hydrocarbon resin comprises less than 30 wt % of the total mixture in the sealing layers. In a preferred embodiment, the carrier polymer and ethylene unsaturated ester copolymer are ethylene vinyl acetate, and the ethylene vinyl acetate comprises greater than 70 wt % of the total mixture.

DETAILED DESCRIPTION

Figure 1:
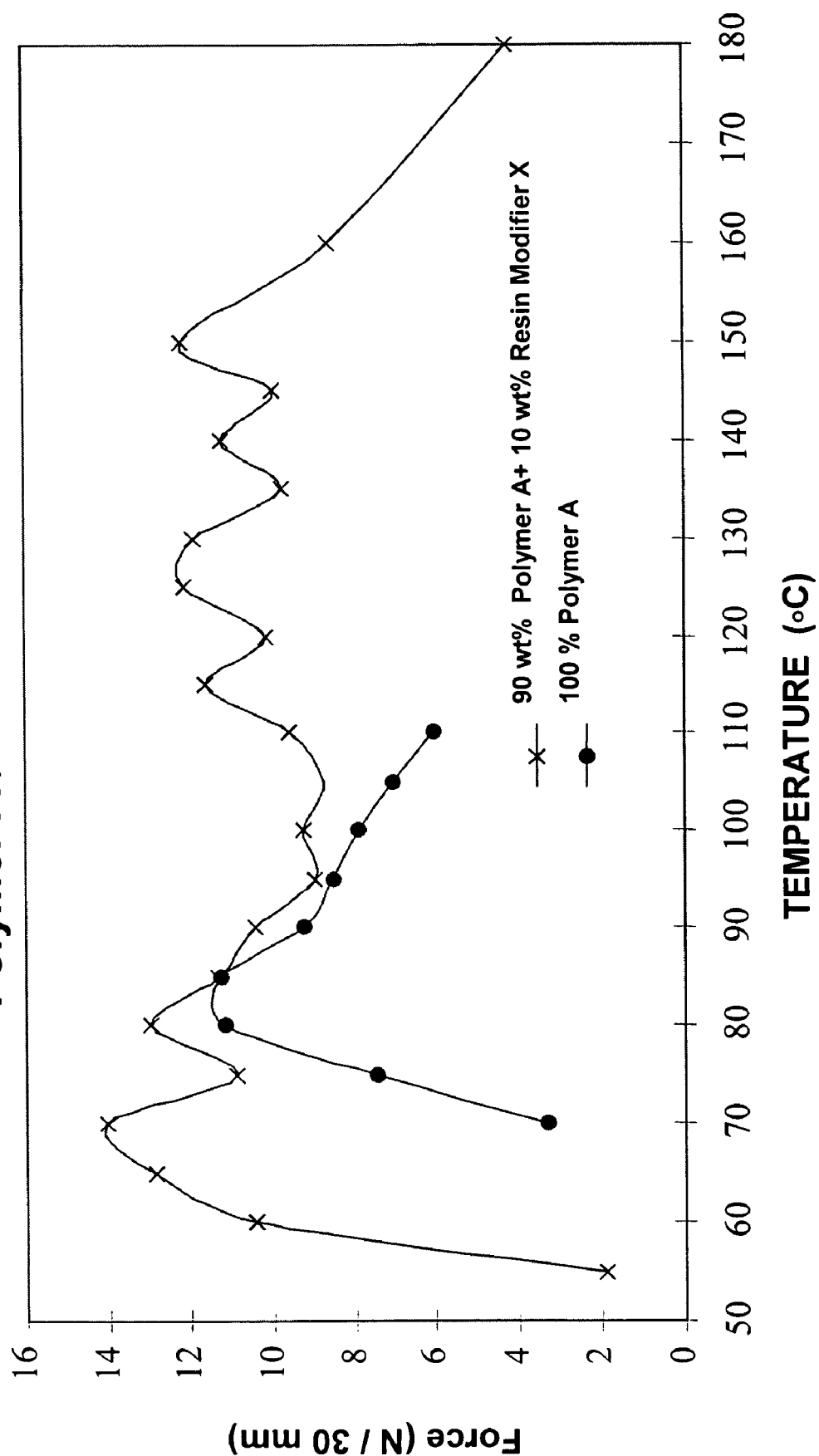
FIGS. 1-2 show a comparison of hot tack strength and delayed hot tack strength of heat sealed structures produced in an extrusion coating process, using as a sealing layer (i) an ethylene-vinyl acetate copolymer containing 18 wt % vinyl acetate and (ii) a combination of 10 wt % resin and 90 wt % ethylene-vinyl acetate copolymer containing 18 wt % vinyl acetate.

The combination of a resin and an ethylene-unsaturated ester copolymer has unique properties that make it particularly useful in applications requiring heat sealability, such as thermal lamination. Incorporating a resin into a sealing layer comprising the ethylene-unsaturated ester copolymer provides improved heat sealing and processing properties when compared to the ethylene-unsaturated ester copolymer used without the resin. While the resin is preferably used in the sealing layer, incorporating the resin into the layers adjacent to the sealing layers of a film or extrusion coating may also provide some of the benefits discussed herein, but primarily provides improved film or coating performance in the areas of interlayer adhesion and barrier properties.

In many applications, processors use an ethylene vinyl acetate copolymer for the sealing layer when forming a sealed article. One or more other core and/or co-extruded layers may be combined with the sealing layer. Examples of unsaturated esters that which may be copolymerized with ethylene include vinyl acetate, vinyl propionate, vinyl butyrate, isobutyrate, vinyl hexanoate, octanoate, 2-ethyl-hexanoate, and any other suitable unsaturated ester comonomer. Vinyl acetate is preferred because of its low cost. In many applications, the copolymer preferably contains less than 35 wt % vinyl ester, more preferably less than 30 wt %, more preferably less than 25 wt %, more preferably between 5 and 25 wt %, and even more preferably between 10 and 20 wt % vinyl ester. However, vinyl ester contents greater than 35 wt % may be used in conjunction with a compatible resin to achieve the desired effects. Examples of ethylene vinyl esters include those available from ExxonMobil Chemical under the trademark Escorene™ Ultra.

Examples of acrylate monomers that may be copolymerized with the ethylene include $C_1$-$C_8$ acrylates, alkyl acrylates such as $C_1$-$C_8$ methacrylates, e.g. n-butyl or isobutyl acrylates and methyl ethyl methacrylate.

The ethylene unsaturated ester copolymers may contain more than one ester monomer, e.g., different chain length ethyl acrylates, or hydrolyzed ester groups, such as vinyl acetate (as previously described) or vinyl alcohols. There may also be some acrylic and methacrylic acid incorporated as monomers.

The molecular weight of the ethylene unsaturated copolymer is preferably greater than 50,000, more preferably greater than 60,000 and more preferably greater than 65,000. Suitable ranges of molecular weight may be preferably from 50,000 to 100,000, more preferably 60,000 to 90,000, and more preferably 65,000 to 85,000. The melt index of the ethylene unsaturated copolymer is preferably ≦100, more preferably ≦75, more preferably ≦50, more preferably ≦35, more preferably ≦25, more preferably ≦20, more preferably ≦15, more preferably ≦14, more preferably ≦13, more preferably ≦12, more preferably ≦11, more preferably ≦10, more preferably ≦9, more preferably ≦8, more preferably ≦7, more preferably ≦6, more preferably ≦5, more preferably ≦4, more preferably ≦3, more preferably ≦2, more preferably ≦1, more preferably ≦0.75, more preferably ≦0.5. Suitable ranges also include those between any of the values above listed for melt index.

The viscosity of the resulting combination of resin and ethylene unsaturated ester copolymer is preferably ≧30, more preferably ≧50, more preferably ≧75, more preferably ≧100, measured in mPa·s at 180° C.

Examples of resins that may be used include aliphatic hydrocarbon resins, hydrogenated aliphatic hydrocarbon resins, aliphatic/aromatic hydrocarbon resins, hydrogenated aliphatic aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and mixtures of two or more thereof. As used herein hydrogenated, when referring to the resin, includes fully, substantially and at least partially hydrogenated resins as described below. Particularly preferred resins include aromatic modified aliphatic resins, aromatic modified cycloaliphatic resin, and partially hydrogenated aromatic hydrocarbon resins having an aromatic content of 1-60%, more preferably 1-40%, more preferably 1-20%, more preferably 10-20%, more preferably 15-20%, more preferably 1-10%, and more preferably 5-10%.

Resins particularly suited for use as described herein include EMPR 120, 104, 111, 106, 112, 115, EMFR 100 and 100A, ECR-373 and Escorez® 2101, 2203, 2520, 5380, 5600, 5618, 5690, available from ExxonMobil Chemical Company, ARKON™ M90, M100, M115 and M135 and SUPER ESTER™ rosin esters available from Arakawa Chemical Company of Japan, SYLVARES™ phenol modified styrene-α methyl styrene resins, styrenated terpene resins, ZONATAC terpend-aromatic resins, and terpene phenolic resins available from Arizona Chemical Company, SYLVATAC™ and SYLVALITE™ rosin esters available from Arizona Chemical Company, NORSOLENE™ aliphatic aromatic resins available from Cray Valley of France, DERTOPHENE™ terpene phenolic resins available from DRT Chemical Company of Landes, France, EASTOTAC™ resins, PICCOTAC™ $C_5$/$C_9$ resins, REGALITE™ and REGALREZ™ aromatic and REGALITE™ cycloaliphatic/aromatic resins available from Eastman Chemical Company of Kingsport, Tenn., WINGTACK™ ET and EXTRA available from Goodyear Chemical Company, FORAL™, PENTALYN™, AND PERMALYN™ rosins and rosin esters available from Hercules (now Eastman Chemical Company), QUINTONE™ acid modified $C_5$ resins, $C_5$/$C_9$ resins, and acid modified $C_5$/$C_9$ resins available from Nippon Zeon of Japan, and LX™ mixed aromatic/cycloaliphatic resins available from Neville Chemical Company, CLEARON hydrogenated terpene aromatic resins available from Yasuhara. The preceding examples are illustrative only and by no means limiting.

As used herein aromatic content and olefin content are measured by $^1$H-NMR as measured directly from the $^1$H NMR spectrum from a spectrometer with a field strength greater than 300 MHz, most preferably 400 MHz (frequency equivalent). Aromatic content is the integration of aromatic protons versus the total number of protons. Olefin proton or olefinic proton content is the integration of olefinic protons versus the total number of protons.

In another embodiment, the resin is preferably at least partially hydrogenated and more preferably substantially hydrogenated. As used herein at least partially hydrogenated means that the material contains less than 90% olefinic protons, more preferably less than 75% olefinic protons, more preferably less than 50% olefinic protons, more preferably less than 40% olefinic protons, more preferably less than 25% olefinic protons, more preferably less than 15% olefinic protons, more preferably less than 10% olefinic protons, more preferably less than 9% olefinic protons, more preferably less than 8% olefinic protons, more preferably less than 7% olefinic protons, and more preferably less than 6% olefinic protons. As used herein, substantially hydrogenated means that the material contains less than 5% olefinic protons, more preferably less than 4% olefinic protons, more preferably less than 3% olefinic protons, more preferably less than 2% olefinic protons, more preferably less than 1% olefinic protons, more preferably less than 0.5% olefinic protons, more preferably less than 0.1% olefinic protons, and more preferably less than 0.05% olefinic protons after hydrogenation. The degree of hydrogenation is typically conducted so as to minimize and preferably avoid hydrogenation of the aromatic bonds.

The resin used in combination with the ethylene-unsaturated ester copolymer described herein are preferably relatively low molecular weight hydrocarbon resins generally having molecular weights below 10,000, more preferably below 5000, more preferably below 3000, more preferably below 2500, and even more preferably below 2000. The resin preferably has a glass transition temperature (Tg) between −80° C. and 150° C., more preferably between −50° C. to 100° C., more preferably between 0° C. to 80° C., more preferably 20° C. to 70° C. and 30° C. to 60° C., wherein a preferred range may be any upper Tg limit combined with any lower Tg limit described herein. The resin preferably has a softening point between −30° C. and 200° C., more preferably between 0° C. to 150° C., more preferably between 50° C. to 130° C., more preferably 70° C. to 1200° C. and 80° C. to 110° C., wherein 10° and 120° C., and even more preferably between 20° C. and 100° C., wherein a preferred range may be any upper softening point limit combined with any lower softening point limit described herein. The resin is preferably an amorphous material usually exhibiting little or no melting points.

Hydrocarbon Resin Production

Hydrocarbon resins are well known and are produced, for example, by Friedel-Crafts polymerisation of various feeds, which may be pure monomer feeds or refinery streams containing mixtures of various unsaturated materials. Generally speaking, the purer the feed the easier to polymerise. For example pure styrene, pure α-methyl styrene and mixtures thereof are easier to polymerise than a $C_8/C_9$ refinery stream. Similarly, pure or concentrated piperylene is easier to polymerise than $C_4$-$C_6$ refinery streams. These pure monomers are, however, more expensive to produce than the refinery streams which are often by-products of large volume refinery processes.

Aliphatic hydrocarbon resins can be prepared by cationic polymerisation of a cracked petroleum feed containing $C_4$, $C_5$, and $C_6$ paraffins, olefins, and conjugated diolefins referred to herein as $C_5$ monomers. As used herein, $C_5$ monomers preferably excludes DCPD monomers removed by thermal soaking as described below. These $C_5$ monomer streams comprise cationically and thermally polymerisable monomers such as butadiene, isobutylene, 1,3-pentadiene (piperylene) along with 1,4-pentadiene, cyclopentene, 1-pentene, 2-pentene, 2-methyl-1-pentene, 2-methyl-2-butene, 2-methyl-2-pentene, isoprene, cylcohexene, 1-3-hexadiene, 1-4-hexadiene, cyclopentadiene, and dicyclopentadiene. To obtain these feeds the refinery streams are preferably purified usually by both fractionation and treatment to remove impurities. In some embodiments, the $C_5$ feed stream may include at least some (preferably less than 2 wt %) cyclopentadiene (CPD) and substituted cyclopentadiene (e.g, methylcyclopentadiene) components. These components are optionally separated from the $C_5$ monomer streams by thermal soaking wherein the feed stream is heated to a temperature between 100° C. and 160° C., preferably between 100° C. and 150° C., for 0.5 to 6 hours, followed by separation of the DCPD monomers to reduce the level of cyclopentadiene and/or dicyclopentadiene in the $C_5$ monomer stream to preferably below 2 wt %. Low temperature heat soaking is preferred in order to limit the cyclic diene (cyclopentadiene and methylcyclopentadiene) co-dimerisation with $C_5$ linear conjugated dienes (isoprene and pentadienes 1,3 cis- and trans-). The thermal soaking step preferably dimerizes the cyclopentadiene and substituted cyclopentadiene, making separation from the $C_5$ monomer stream easier. After fractionation and, if carried out, thermal soaking, the feedstock is preferably subjected to distillation to remove cyclic conjugated diolefins which are gel precursors (cyclopentadiene and methylcyclopentadiene being removed as dimers, trimers, etc.).

One example of a $C_5$ monomer stream is a steam cracked petroleum stream boiling in the range of −10° C. to 100° C. Examples of commercial samples of $C_5$ monomer feedstocks include Naphtha Petroleum 3 Piperylenes from Lyondell Petrochemical Company, Houston, Tex., regular Piperylene Concentrate or Super Piperylene Concentrate both from Shell Nederland Chemie B.V., Hoogvilet, the Netherlands.

The resin polymerization feed may also comprise $C_8$-$C_{10}$ aromatic monomers (referred to herein as $C_9$ monomers) such as styrene, indene, derivatives of styrene, derivatives of indene, and combinations thereof. Particularly preferred aromatic olefins include styrene, α-methylstyrene, β-methylstyrene, indene, methylindenes and vinyl toluenes. One example of a $C_9$ monomer stream is a steam cracked petroleum stream boiling in the range of −10° C. to 210° C. (135° C. to 210° C. if the $C_5$ monomers and DCPD components are not present). Examples of commercial $C_9$ monomer feedstocks include LRO-90 from Lyondell Petrochemical Company, Houston, Tex., DSM $C_9$ Resinfeed Classic from DSM, Geleen, the Netherlands, RO-60 and RO-80 from Dow Chemical Company of Midland, Mich., and Dow Resin Oil 60-L from the Dow Chemical Company of Temeuzen, the Netherlands.

In addition to the reactive components, non-polymerisable components in the feed may include saturated hydrocarbons such as pentane, cyclopentane, or 2-methyl pentane that can be co-distilled with the unsaturated components. This monomer feed can be co-polymerised with other $C_4$ or $C_5$ olefins or dimers. Preferably, however, the feeds are purified to remove unsaturated materials that adversely affect the polymerisation reaction or cause undesirable colors in the final resin (e.g., isoprene). This is generally accomplished by fractionation. In one embodiment, polymerization is conducted using Friedel-Crafts polymerisation catalysts such as supported or unsupported Lewis acids (e.g., boron trifluoride ($BF_3$), complexes of boron trifluoride, aluminum trichloride ($AlCl_3$), complexes of aluminum trichloride or alkyl aluminum halides, particularly chlorides). Suitable reaction conditions for Friedel-Crafts polymerization include temperatures of −20° C. to 100° C., pressures of 100-2000 kPa. In one embodiment, $C_5$ and $C_9$ monomers are polymerized by such a process.

Typically, the feed stream includes between 20-80 wt % monomers and 20-80 wt % solvent. Preferably, the feed stream includes 30-70 wt % monomers and 30-70 wt % of solvent. More preferably, the feed stream includes 50-70 wt % monomers and 30-50 wt % of solvent. The solvent may include an aromatic solvent, which may be toluenes, xylenes, other aromatic solvents, aliphatic solvents and/or mixtures of two or more thereof. The solvent is preferably recycled. The solvent may comprise the unpolymerisable component of the feed. The solvents generally contain less than 250 ppm water, preferably less than 100 ppm water, and most preferably less than 50 ppm water.

In another embodiment, the feed stream includes 30-95 wt % of $C_5$ monomers, as described above and 5-70 wt % of a co-feed including at least one member selected from the group consisting of pure monomer, $C_9$ monomers, and terpenes. Preferably, the feed stream includes about 50-85 wt % of $C_5$ monomers and about 15-50 wt % of a co-feed, including at least one member selected from the group consisting of pure monomer, $C_9$ monomers, and terpenes.

Typically, the resulting hydrocarbon resin has a number-average molecular weight (Mn) of 400-3000, a weight-average molecular weight (Mw) of 500-6000, a z-average molecular weight (Mz) of 700-15,000 and a polydispersity (PD) as measured by Mw/Mn between 1.5 and 4. As used herein, molecular weights (number average molecular weight (Mn), weight average molecular weight (Mw), and z-average molecular weight (Mz)) are measured by Size Exclusion Chromatography using a Waters 150 Gel Permeation Chromatograph equipped with a differential refractive index detector and calibrated using polystyrene standards. Samples are run in tetrahydrofuran (THF) (45° C.). Molecular weights are reported as polystyrene-equivalent molecular weights and are generally measured in g/mol.

The monomer feed can be co-polymerised with $C_4$ or $C_5$ olefins or their olefinic dimers as chain transfer agents. Up to 40 wt %, preferably up to 20 wt %, of chain transfer agents may be added to obtain resins with lower and narrower molecular weight distributions than can be prepared from using the monomer feed alone. Chain transfer agents stop the propagation of a growing polymer chain by terminating the chain in a way, which regenerates a polymer initiation site. Components, which behave as chain transfer agents in these reactions include but are not limited to, 2-methyl-1-butene, 2-methyl-2-butene or dimers or oligomers of these species. The chain transfer agent can be added to the reaction in pure form or diluted in a solvent.

A DCPD resin and/or oligomers thereof (also referred to a CPD oligomers) may be obtained by or derived from thermal polymerisation of a feed comprising unsaturated monomers of DCPD and/or substituted DCPD. In one embodiment, the feed also comprises aromatic monomers as previously described. In such embodiments, a mixture of (a) DCPD stream, preferably a steam cracked petroleum distillate boiling in the range 80-200° C., more preferably 140° C. to 200° C., containing dimers and codimers of cyclopentadiene and its methyl derivatives together with (b) $C_9$ monomers, preferably a steam cracked distillate boiling in the range 150-200° C. comprising α-methyl styrene, vinyl toluenes, indene and methyl indene with other $C_9$ and $C_{10}$ aromatics, in the weight ratio (a:b) between 90:10 to 50:50 is heated in a batch polymerization reactor to 160-320° C. at a pressure of $9.8 \times 10^5$-$20 \times 10^5$ Pa, more preferably $9.8 \times 10^5$-$11.7 \times 10^5$ Pa for 1.2 to 4 hrs, more preferably 1.5 to 4 hrs. Where inclusion of the oligomers is not desired, the resulting polymerizate may steam stripped to remove inert, unreacted, and low molecular weight oligomeric components to yield a resin having a softening point in the range 80-120° C.

In one embodiment, the resin is preferably obtained by or derived from thermal polymerisation of a feed comprising $C_5$ monomers and $C_9$ monomers as previously described. In such embodiments, a mixture of (a) $C_5$ monomers, preferably, a steam cracked petroleum distillate boiling in the range 80-200° C. containing $C_5$ monomers together with (b) $C_9$ monomers, preferably a steam cracked distillate boiling in the range 150-200° C. comprising α-methyl styrene, vinyl toluenes, indene and methyl indene with other $C_8$-$C_{10}$ aromatics, in the weight ratio (a:b) between 90:10 to 50:50 is heated in a batch polymerization reactor to 160-320° C. at a pressure of $9.8 \times 10^5$-$20 \times 10^5$ Pa, more preferably $9.8 \times 10^5$-$11.7 \times 10^5$ Pa for 1.2 to 4 hrs, more preferably 1.5 to 4 hrs. Where inclusion of the oligomers is not desired, the resulting polymerizate may be steam stripped to remove inert, unreacted, and low molecular weight oligomeric components to yield a resin having a softening point in the range 80-120° C.

The products of the polymerization process include both resin and an oligomer by-product comprising oligomers (dimers, trimers, tetramers, pentamers, and hexamers, and optionally septamers and octamers) of the feed monomer(s). As used hereafter, resin material refers to the resin, the oligomers, or a mixture of the two. In an embodiment where the oligomer by-product results from thermal polymerization of DCPD and substituted DCPD, the oligomers are typically a complex mixture of (preferably hydrogenated as described below) Diels Alder trimers and tetramers of CPD and methyl-CPD with low levels of acyclic $C_5$ diolefins such as pentadiene-1,3 and isoprene.

The resin material is then preferably hydrogenated to reduce coloration and improve color stability. Any of the known processes for catalytically hydrogenating resin material can be used. In particular the processes disclosed in U.S. Pat. No. 5,171,793, U.S. Pat. No. 4,629,766, U.S. Pat. No. 5,502,104 and U.S. Pat. No. 4,328,090 and WO 95/12623 are suitable. Generic hydrogenation treating conditions include reactions in the temperature range of about 100-350° C. and pressures of between five atmospheres (506 kPa) and 300 atm (30390 kPa) (and up to 400 atm) hydrogen, for example, 10-275 atm (1013-27579 kPa). In one embodiment the temperature is in the range including 180-330° C. and the pressure is in the range including 15195-20260 kPa hydrogen. The hydrogen to feed volume ratio to the reactor under standard conditions (25° C., 1 atm (101 kPa) pressure) typically can range from 20:1-200:1; for water-white resins 100:1-200:1 is preferred. The hydrogenated product may be stripped to remove low molecular weight by-products and any solvent. This oligomeric by-product is a low-viscosity nearly colorless liquid boiling between 250-400° C. and is preferably substantially hydrogenated.

The hydrogenation of the resin material may be carried out via molten or solution based processes by either a batch wise or, more commonly, a continuous process. Catalysts employed for the hydrogenation of hydrocarbon resins are typically supported monometallic and bimetallic catalyst systems based on group 6, 8, 9, 10 or 11 elements. Catalysts such as nickel on a support (for example, nickel on alumina, nickel on charcoal, nickel on silica, nickel on kieselguhr, etc), palladium on a support (for example, palladium on silica, palladium on charcoal, palladium on magnesium oxide, etc) and copper and/or zinc on a support (for example copper chromite on copper and/or manganese oxide, copper and zinc on alumina, etc) are good hydrogenation catalysts. The support material is typically comprised of such porous inorganic refractory oxides as silica, magnesia, silica-magnesia, zirconia, silica-zirconia, titania, silica-titania, alumina, silica-alumina, alumina-silicate, etc, with supports containing γ-alumina being highly preferred. Preferably, the supports are essentially free of crystalline molecular sieve materials. Mixtures of the foregoing oxides are also contemplated, especially when prepared as homogeneously as possible. Useful support materials include those disclosed in the U.S. Pat. Nos. 4,686,030, 4,846,961, 4,500,424, and 4,849,093. Suitable supports include alumina, silica, carbon, MgO, $TiO_2$, $ZrO_2$, $Fe_2O_3$ or mixtures thereof.

Another suitable process for hydrogenating the resin material is described in EP 0082726. EP 0082726 describes a process for the catalytic or thermal hydrogenation using a nickel-tungsten catalyst on a gamma-alumina support wherein the hydrogen pressure is $1.47 \times 10^7$-$1.96 \times 10^7$ Pa and the temperature is in the range of 250-330° C. After hydrogenation the reactor mixture may be flashed and further separated to recover hydrogenated resin material. In one embodiment, steam distillation may be used to separate the oligomers and is preferably conducted without exceeding 325° C. resin temperature.

In one embodiment, the catalyst comprises nickel and/or cobalt and one or more of molybdenum, tungsten on one or more alumina or silica supports wherein the amount of nickel oxide and/or cobalt oxide on the support ranges from 2-10 wt %. The amount of tungsten or molybdenum oxide on the support after preparation ranges from 5-25 wt %. Preferably, the catalyst contains 4-7 wt % nickel oxide and 18-22 wt % tungsten oxide. This process and suitable catalysts are described in greater detail in U.S. Pat. No. 5,820,749. In another embodiment, the hydrogenation may be carried out using the process and catalysts described in U.S. Pat. No. 4,629,766. In particular, nickel-tungsten catalysts on gamma-alumina are preferred.

In one embodiment, the oligomers are stripped from the resin before hydrogenation. In such an embodiment, the oligomers are preferably hydrogenated before grafting. In another embodiment, the oligomers are hydrogenated with the resin and then stripped from the resin, yielding a hydrogenated resin and hydrogenated oligomers. In another embodiment, at least some of the oligomers are stripped before hydrogenation and at least some hydrogenated oligomers are stripped after hydrogenation. In yet another embodiment, the hydrogenated resin/oligomers product may be further processed together as a single mixture as described below. In yet another embodiment, the oligomers can be derived from any suitable source and hydrogenated (if necessary) before grafting so that the oligomers before grafting are typically at least partially hydrogenated and preferably substantially hydrogenated.

Grafted Hydrocarbon Resin

As used herein, a grafted hydrocarbon resin, oligomer, and/or resin material, or a combination thereof means it has been combined, contacted, and/or reacted with a graft monomer. Grafting is the process of combining, contacting, or reacting the hydrocarbon resin, oligomers and/or resin material with the graft monomer. Grafting hydrocarbon resins, oligomers, and/or resin material, or a combination thereof to include at least some polar functionality produces useful components for many applications such as adhesive formulations, especially HMA formulations. These formulations are often designed for use with polar polymers, such as EVAs, ethylene methyl acrylates (EMAs), polyacrylates (PAs), polymethacrylates (PMAs), ethylene alkyl acrylates and for use on polar substrates, such as PET, recycled paper, cardboard, and acrylic varnishes and work well on other substrates such as wood, glass, ceramic, asphalt, concrete, and metal.

Accordingly, embodiments of the present invention include grafted and ungrafted hydrocarbon resin(s) and oligomer(s) and combinations and mixtures thereof. Embodiments also include, but are not limited to: adhesives or adhesive components comprising (i) grafted hydrocarbon resins; (ii) grafted oligomers, (iii) grafted oligomers+ungrafted resin(s), (iv) grafted hydrocarbon resin+ungrafted resin(s), (v) grafted hydrocarbon resin+ungrafted oligomers, (vi) grafted hydrocarbon resin+grafted oligomers, (vii) grafted oligomers+ungrafted oligomers or (viii) grafted hydrocarbon resin+grafted oligomers+ungrafted resin(s) and other suitable combinations of one or more thereof. The embodiments described herein also include processes for making and using the previously described materials.

Suitable hydrocarbon resins that may be grafted include: aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, polyterpene resins, terpene-phenol resins, and mixtures of two or more thereof. Rosin esters may also be grafted. Preferably, the resin is at least partially hydrogenated, more preferably substantially hydrogenated, and more preferably comprises aromatic monomers.

In one embodiment, the resin comprises hydrocarbon resins produced by the thermal polymerization of dicyclopentadiene (DCPD) or substituted DCPD, which may further include aliphatic or aromatic monomers as described later. In a preferred embodiment, hydrocarbon resins produced by the thermal polymerization of DCPD or substituted DCPD and $C_9$ monomer contain less than 10% aromatics in the final resin product. In another embodiment the resin comprises a $C_5/C_9$ (aliphatic/aromatic) hydrocarbon resin derived by polymerization (preferably thermal or catalytic) of $C_5$ monomers and $C_9$ monomers.

Grafted Oligomers

Another embodiment is a material comprising grafted oligomers (dimers, trimers, tetramers, pentamers, hexamers and optionally septamers and octamers), preferably derived from a petroleum distillate boiling in the range of 30-210° C. The oligomers can be derived from any suitable process and are often derived as a byproduct of resin polymerization, whether thermal or catalytic. The oligomers may be derived from processes wherein suitable DCPD, $C_5$ and/or $C_9$ monomer feeds (as described below) are oligomerized and then grafted. Suitable oligomer streams have molecular weights (Mn) between 130-500, more preferably between 130-410, more preferably between 130-350, more preferably between 130-270, more preferably between 200-350, and more preferably between 200-320.

In one embodiment the oligomers comprise cyclopentadiene and substituted cyclopentadiene monomers and may further comprise $C_9$ monomers. In another embodiment, the oligomers comprise Cs monomers and may further comprise $C_9$ monomers. Other monomers may also be present, including $C_4$-$C_6$ mono- and di-olefins and terpenes. The oligomers may also comprise $C_9$ monomers alone. In each embodiment, it is preferred that the oligomers are at least partially hydrogenated, more preferably substantially hydrogenated before grafting with the graft monomer. Specific examples of suitable individual cyclopentadiene and substituted cyclopentadiene monomers (including DCPD), $C_9$ monomers and $C_5$ monomers are described below. Suitable oligomers may also comprise a mixture of more or more preferred oligomer materials as described herein.

In a preferred embodiment, the hydrocarbon resin/and or oligomers has an aromatic content of 1-60%, more preferably 1-40%, more preferably 1-20%, more preferably 1-15%, more preferably 10-20%, more preferably 15-20%, more preferably 1-10%, and more preferably 5-10%, wherein any upper limit and any lower limit of aromatic content may be combined for a preferred range of aromatic content. In one embodiment, the hydrocarbon resin to be grafted has a softening point of 10-200° C., more preferably 10-160° C., more preferably 60-130° C., more preferably 90-130° C., more preferably 80-120° C., more preferably 80-150° C., and more preferably 90-110° C., wherein any upper limit and any lower limit of softening point may be combined for a preferred softening point range. Softening point (° C.) is preferably measured as a ring and ball softening point according to ASTM E-28 (Revision 1996).

As used herein aromatic content and olefin content are measured by $^1$H-NMR as measured directly from the $^1$H NMR spectrum from a spectrometer with a field strength greater than 300 MHz, most preferably 400 MHz (frequency equivalent). Aromatic content is the integration of aromatic protons versus the total number of protons. Olefin proton or olefinic proton content is the integration of olefinic protons versus the total number of protons.

The resin and/or oligomers are preferably at least partially hydrogenated and more preferably substantially hydrogenated as previously described. In preferred embodiments wherein the resin and/or oligomers are substantially hydrogenated, it is believed that the graft monomer is appended to the resin/oligomer backbone as opposed to forming a copolymer (of resin/oligomers and graft monomers) because of the lack of terminal olefinic bonds on the substantially hydrogenated resin/oligomers (as indicated by the preferred low olefinic proton measurements).

As stated, both the resins and oligomers preferably comprise one or more aromatic monomers. The data below suggests that an aromatic material yields better performance in adhesives comprising aromatic-containing graft material. Additionally, certain graft monomers, such as maleic anhydride, have good solubility in an aromatic-containing material, which probably allows for a more homogeneous reaction phase and likely avoids undesirable byproducts during the grafting reaction.

Graft Monomers

Preferred graft monomers include any unsaturated organic compound containing at least one olefinic bond and at least one polar group such as a carbonyl group, which includes unsaturated acids and anhydrides and derivatives thereof. Preferably, the organic compound contains an ethylenic unsaturation conjugated with a carbonyl group (—C=O) and preferably contains at least one α, β olefin bond. Preferred graft monomers include acids, alcohols, anhydrides, imides, amides, and derivatives thereof. Examples include carboxylic acids, acid halides or anhydrides, alcohols (phenols, monoalcohols, diols, and polyols), and derivatives thereof. Representative acids and acid derivatives include carboxylic acids, anhydrides, acid halides, esters, amides, imides and their salts, both metallic and non-metallic. Examples include maleic, fumaric, acrylic, methacrylic, itaconic, aconitic, citraconic, himic, tetrahydrophthalic, crotonic, α-methyl crotonic, and cinnamic acids. Maleic anhydride is a particularly preferred graft monomer. Particular examples include, itaconic anhydride, citraconic anhydride, methyl acrylate, methyl methacrylate, ethyl acrylate, ethyl methacrylate, glycidyl acrylate, monoethyl maleate, diethyl maleate, dibutyl maleate, monomethyl fumarate, dimethyl fumarate, monomethyl itaconate, diethyl itaconate, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monobutylamide, fumaric acid-N,N-dibutylamide, maleimide, N-butylmaleimide, N-phenylmaleimide, sodium acrylate, sodium methacrylate, potassium acrylate and potassium methacrylate. Preferred graft monomers include acids, anhydrides, alcohols, amides and imides.

Grafting the Resin Material

At least a portion of the resulting resin material, preferably derived from a process such as that described above, may then be combined and/or contacted with a graft monomer, typically under suitable reaction conditions and in a suitable mixing device. In a preferred embodiment, the reaction is conducted in the absence of significant shear. In accordance with the previously described embodiments, the resin and oligomers may be grafted separately or simultaneously, and if separately, grafted oligomers may then be optionally remixed with the grafted resin, an ungrafted resin, or any another suitable resin, adhesive component or composition as described below.

Grafting of the graft monomer preferably occurs in the presence of a free-radical initiator selected from the group consisting of organic peroxides, organic per-esters, and azo compounds. Examples of such compounds include benzoyl peroxide, dichlorobenzoyl peroxide, dicumyl peroxide, di-tert-butyl peroxide, 2,5-dimethyl-2,5-di(peroxybenzoate) hexyne-3, 1,4-bis(tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tert-butylperphenyl acetate, tert-butyl perisobutyrate, tert-butyl per-sec-octoate, tert-butyl perpivalate, cumyl perpivalate, tert-butyl hydroperoxide, tert-butyl perdiethylacetate, azoisobutyronitrile, and dimethyl azoisobutyrate. The peroxide preferably has a half-life of about 6 minutes at 160° C. with volatile non-aromatic decomposition products and those that minimize color formation. Preferred peroxides include di-tert-butyl peroxide and 2,5 dimethyl-2,3-di(tert-butylperoxy)hexane. The amount of peroxide combined is typically dependent on the weight of the graft monomer. In one embodiment, the weight ratio of the graft monomer:peroxide in the reaction mixture may be between 1 and 20, more preferably between about 1 and 10, more preferably between about 1 and about 5, and even more preferably about 4.

The graft monomers may be combined with the resin material at a temperature between 50-200° C., more preferably between 70-150° C., more preferably between 70-125° C., more preferably between 140-180° C., more preferably between 140-180° C., more preferably between 155-165° C. or between 165-175° C. and a pressure of typically one atmosphere but higher pressures can be used if necessary. In one embodiment the reaction temperature is 170-185° C. In another preferred embodiment, the grafting reaction occurs at temperature greater than 90° C., more preferably between 90° C. and any temperature limit described above, more preferably between 90° C. and 150° C., more preferably between 90° C. and 145° C. In general, the lower limit of the reaction temperature is governed by the softening point of the resin as it is preferred to conduct the grafting reactions at temperatures above the softening point of the material to be grafted.

The graft monomer may be combined so that the weight ratio of graft monomer:resin material in the reaction mixture is less than 1, more preferably less than 0.5 more preferably less than 3:10 and more preferably less than 3:20. In a preferred embodiment, the reaction mixture is maintained in a homogenous state. The reaction mixture is preferably agitated or stirred vigorously. The free radical initiator is combined with the resin material-graft monomer reaction mixture either in one addition or preferably in a continuous or semi continuous mode during the reaction. Residence time in the reaction zone is preferably less than 75 minutes, more preferably less than 60 minutes, even more preferably between 30-60 minutes.

In embodiments where only the oligomers are grafted, the reaction temperature is preferably between 50-200° C., more preferably between 70-150° C., more preferably between 70-125° C., more preferably between 140-180° C., more preferably between 140-180° C., more preferably between 155-165° C., and more preferably about 160° C. In one embodiment the reaction temperature is 170-185° C. In another preferred embodiment, the grafting reaction occurs at temperature greater than 90° C., more preferably between 90° C. and any temperature limit described above, more preferably between 90° C. and 150° C., more preferably between 90° C. and 145° C.

The amount of graft monomer added is typically dependent on the amount of oligomer. Preferably, the oligomer:graft monomer mole ratio is between 5 and 0.2, more preferably between 2 and 0.5, more preferably between about 1.5 and 0.67 and more preferably about 1. Thereafter, the ungrafted oligomers are stripped from the product and optionally recycled to the reaction zone. The grafted oligomers produced generally have a softening point between 0-120° C., more preferably between 25-120° C., more preferably between 50-120° C. and even more preferably between 80-110° C. and color of 4-10 Gardner. Gardner color, as used herein, is measured using ASTM D-6166. The grafted oligomer product can then be recombined with the resin (grafted or ungrafted) from which it was derived or combined with other resins, polymers, and/or other materials and formulated into and adhesive material.

In embodiments where only the resin is grafted, the reaction temperature is preferably between 50-200° C., more preferably between 70-150° C., more preferably between 70-125° C., more preferably between 140-180° C., more preferably between 140-180° C., more preferably between 165-175° C., and more preferably about 170° C. In another preferred embodiment, the grafting reaction occurs at temperature greater than 90° C., more preferably between 90° C. and any upper temperature limit described above. The amount of graft monomer added is typically dependent on the amount of resin. The graft monomer:resin weight ratio in the reaction mixture is preferably less than 1:5, more preferably less than 1:10, more preferably less than 1:20, and even more preferably about 1:40. Generally, the grafting raises the softening point of the resin less than 10° C., more preferably less than 5° C. and produces a grafted resin having a color between 1-6 Gardner.

In another embodiment, the oligomers are not stripped from the resin product, and the resin and oligomers are simultaneously grafted. Reaction conditions are similar to those previously described for grafting the resin, but the graft monomer:resin material weight ratio is generally kept below 0.5, more preferably below 0.25 and more preferably below 3:20. Upon completion of grafting, the material may be further stripped if required to yield a resin of the desired softening point and/or to remove unreacted oligomers. Separation of the grafted oligomers from the grafted resin may also be made if desired, but the product may be used without such further processing. In many embodiments comprising grafted resin and grafted oligomers, the weight ratio of grafted oligomers:grafted resin in the resin material will be greater than 0.005, more preferably greater than 0.01, more preferably greater than 0.02, more preferably greater than 0.05, and more preferably greater than 0.1.

Grafting of the resin material can also be conducted via a solution route wherein the resin material dispersed in a solvent and combined, contacted and/or reacted with the graft monomer. Additionally or alternatively, the graft monomer can be dispersed in a solvent prior to adding to the resin material. These routes allow for lower reaction temperatures (as low as 100° C.) and allows the choice of different peroxides having half-lives of 6 minutes at the lower reaction temperatures. Suitable solvents include, but are not limited to, aliphatic solvents, cycloaliphatic solvents, aromatic solvents, and aromatic-aliphatic solvents. Typical examples include benzene, toluene, xylene, chlorobenzene, n-pentane, n-hexane, n-heptane, n-octane, n-decane, iso-heptane, iso-decane, iso-octane, cyclohexane, alkyl cyclohexane, and combinations of two or more thereof.

It is believed that the graft monomer is grafted to the resin material through an olefinic bond of the graft monomer such as an $\alpha$, $\beta$ olefinic bond. It is believed that by grafting the oligomers via this route, the formation of norbornyl ester groups in the grafted resin material is minimized and preferably avoided. Thus, the resulting grafted resin material is substantially free of norbornyl ester groups, i.e., it preferably contains less than 0.5 wt % norbornyl ester groups, more preferably less than 0.1 wt %, more preferably less than 0.05 wt %, more preferably less than 0.01 wt %. The resulting grafted oligomers and/or grafted resin are preferably at least one of a (i) a mono-alkyl succinic acid, anhydride or derivative thereof, or (ii) a $\beta$-alkyl substituted propanoic acid or derivative thereof. The reaction product of the resin material and graft monomer or the product of the combination of the resin material and the graft monomer may also include some oligomers of the graft monomer, which may or may not be removed before formulating a final composition.

The resulting grafted resin material preferably has a softening point between 15-210° C., more preferably 15-170° C., more preferably 65-140° C., more preferably 65-130° C., more preferably 80-120° C., more preferably 90-110° C., and more preferably between about 85-110° C. The grafted resin material preferably has a glass transition temperature (Tg) less than 120° C., more preferably less than 110° C., more preferably between 25-100° C., more preferably between 60-100° C., more preferably 60-80° C., and more preferably between 35-70° C. Differential Scanning Calorimetry (DSC, ASTM D 341-88) was used to measure Tg. The resulting grafted resin material preferably has a Saponification number (mg KOH/g resin material) greater than 10, more preferably greater than 12, more preferably greater than 15, more preferably greater than 16, more preferably greater than 17, more preferably greater than 18, more preferably greater than 19, more preferably greater than 20, more preferably greater than 25. The resulting grafted material preferably has an acid number greater than 10, more preferably greater than 15, more preferably greater than 20.

In one embodiment, the grafted oligomer material has an oligomer:graft monomer molar ratio between 50 and 0.5, more preferably between 10 and 2, more preferably between 5 and 2, more preferably between 1.5 and 0.67, and more preferably about 1. In some embodiments, the weight ratio of graft monomer:resin in a grafted resin product is preferably less than 1, in other embodiments between 0.001 and 1, in other embodiments between 0.01 and 1, in other embodiments between 0.01 and 0.3, in other embodiments between 0.02 and 1, in other embodiments between 0.1 and 1, in other embodiments between 0.33 and 1, and in other embodiments between 0.1 and 0.2, wherein preferred ranges may include between any upper and any lower limit described in this paragraph.

The sealing layer preferably comprises greater than 70 wt %, more preferably greater than 75 wt %, more preferably greater than 80 wt %, more preferably between 80 and 99 wt %, more preferably between 80 and 95 wt % ethylene-unsaturated ester copolymer based on the weight of the combination of the resin and ethylene unsaturated ester copolymer. The sealing layer preferably comprises between 1 and 30 wt %, more preferably between 5 and 30 wt %, more preferably between 5 and 20 wt %, and more preferably 10-15 wt % resin based on weight of the combination of the resin and ethylene unsaturated ester copolymer. The sealing layer may also consist essentially of the ethylene unsaturated ester copolymer and resin combination, and preferably the ethylene unsaturated ester copolymer in the sealing layer consists essentially of a single copolymer, such as a single EVA. The sealing layer(s) preferably contain no anti-block agents.

Combining the resin with the ethylene unsaturated ester copolymer increases hot tack strength at lower sealing temperatures, increases the maximum obtainable hot tack strength, and/or provides increased hot tack strength across a broader range of higher sealing temperatures, i.e. a widened hot tack strength plateau. Consequently, lower SITs and lower sealing temperatures are obtainable by combining the resin and the ethylene unsaturated ester copolymer. Furthermore, the sealing temperature are generally lower for a given hot tack strength value at temperatures below the MSST. In some applications, suitable hot tack strength can be obtained at temperatures as low as 60° C. with continuing acceptable hot tack strength to temperatures as high as 160° C. Suitable hot tack strength can be maintained at temperatures greater than 10° C., more preferably greater than 11° C. more preferably greater than 12° C., more preferably greater than 13° C., more preferably greater than 14° C. more preferably greater than 15° C., more preferably greater than 20° C., and more preferably greater than 25° C. greater than MSST, where the hot tack strength of the ethylene unsaturated ester copolymers alone decrease from the maximum hot tack strength value.

The ethylene-unsaturated ester copolymer and resin are preferably chosen in combination such that at least one of the three, preferably two of the three, and even more preferably all three of the following criteria are met: increased hot tack strength at lower temperatures, overall maximum hot tack strength, and increased hot tack strength over a broader operating range.

Increased Hot Tack Strength at Lower Temperatures

Figure 9:
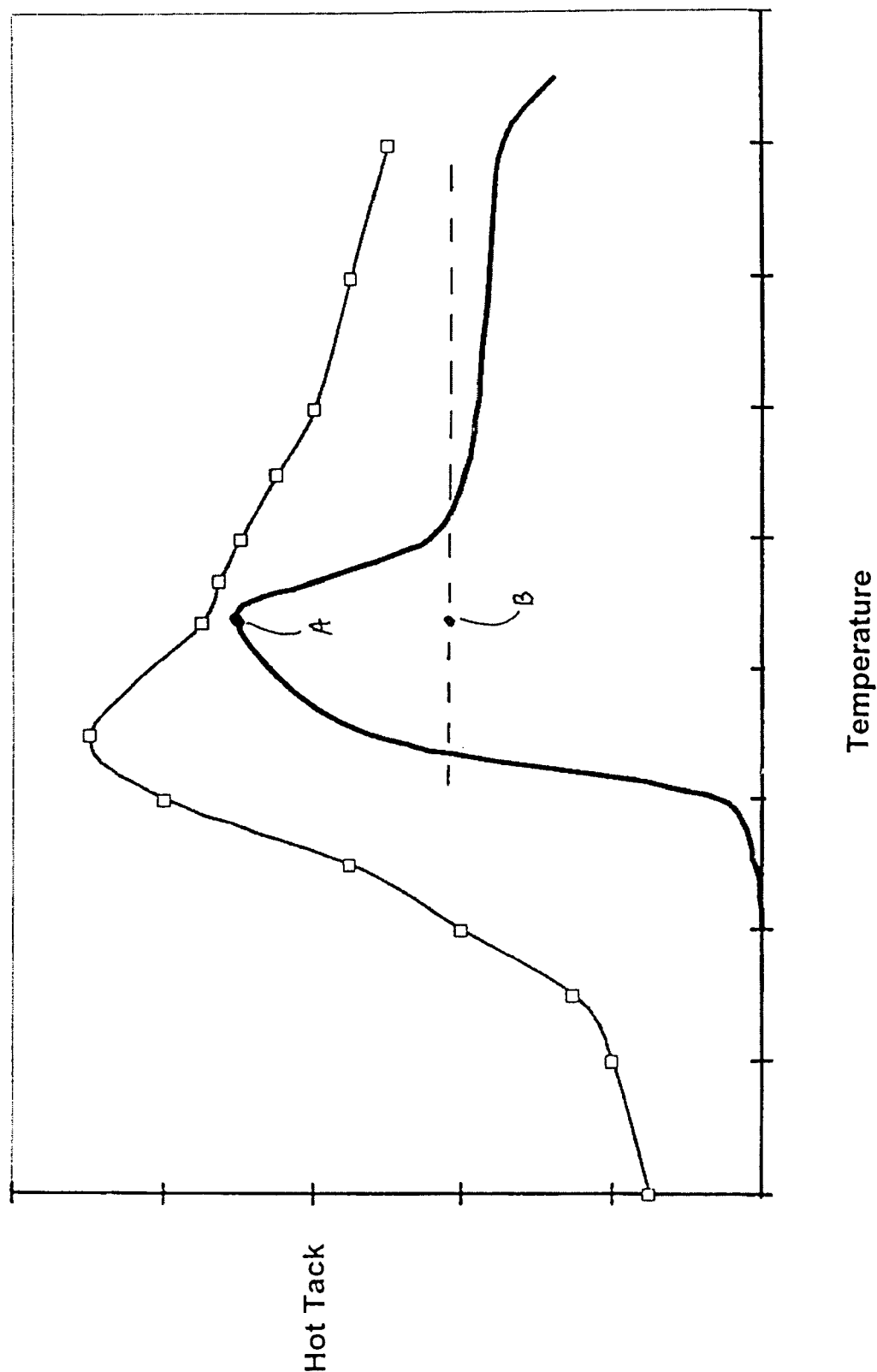
FIG. 9 is an illustration of a hot tack curve.

As shown generically in FIG. 9 and in the Figures demonstrating one or embodiments of the invention, the sealing temperatures at a specific hot tack strength value for the ethylene-unsaturated ester copolymer-resin combination are lower than sealing temperatures for the same hot tack strength value for the ethylene unsaturated ester copolymer alone. By incorporation of the resin, one can retain a desired or predetermined hot tack strength value, yet decrease the corresponding sealing temperature (for that hot tack strength) at least 3° C., more preferably at least 4° C., more preferably at least 5° C., more preferably at least 6° C., more preferably at least 7° C., more preferably at least 8° C., more preferably at least 9° C., more preferably at least 10° C., more preferably at least 11° C., more preferably at least 12° C., more preferably at least 13° C., more preferably at least 14° C., more preferably at least 15° C., and in some embodiments even greater decreases-depending on the copolymer and resins chosen. Similarly, for a given sealing temperature, one obtains increased corresponding hot tack strength by incorporation of the resin.

During processing, the incorporation of the resin as described herein allows the processor to lower the initial and/or operating sealing temperatures to below 115° C., in some embodiments to below 110° C., in some embodiments, to below 105° C., in some embodiments to below 100° C., in some embodiments to below 95° C., in some embodiments to below 90° C., in some embodiments below 80° C., in yet other embodiments below 70° C., in yet other embodiments below 65° C., in yet other embodiments between 50-65° C., in yet other embodiments 55-65° C., in yet other embodiments, 55-75° C., in yet other embodiments 70-80° C., and still other embodiments 65-85° C. Of course, the operating range depends on the ethylene unsaturated ester copolymer and resin combination chosen by the processor.

This property is useful because it allows the seal to be formed with less heat input, which allows processors to obtain heat seals at temperatures lower than conventional processing temperatures for the ethylene-unsaturated ester copolymer alone and with a broader hot tack strength plateau as described below. Thus, in an embodiment illustrated in FIG. 1, suitable hot tack strength is obtained at temperatures as low as 60° C., whereas use of the ethylene-unsaturated ester copolymer alone required between 75-80° C. sealing temperature to achieve the same approximate hot tack strength value.

Greater Maximum Hot Tack Strength

In many cases, the maximum hot tack strength of the ethylene-unsaturated ester copolymer-resin combination is greater than the maximum hot tack strength of the same ethylene-unsaturated ester copolymer alone. This property is useful because a greater maximum hot tack strength provides a stronger, more integral seal, thereby providing integrity and better protection of the article sealed during processing.

Increased Hot Tack Strength Over Broader Operating Range (Extending the Hot Tack Plateau)

The hot tack strength of the ethylene-unsaturated ester copolymer-resin combination is preferably greater than 50% of the maximum hot tack strength of the ethylene-unsaturated ester copolymer alone (i.e, the hot tack strength of the combination >½ the hot tack strength of the ethylene unsaturated ester copolymer alone) at a temperature greater than at temperatures at least 10° C., more preferably at least 11° C. more preferably at least 12° C., more preferably at least 13° C., more preferably at least 14° C. more preferably at least 15° C., more preferably at 20° C., and more preferably at least 25° C. greater than MSST of the ethylene-unsaturated ester copolymer alone. Thus, incorporation of the resin may provide an acceptable range of operating temperatures as wide as between 60° C. and 160° C., but the increased benefits tend to decrease as the temperature is raised appreciably. However, in most applications, processors will not operate more than 25° C., 30° C. or 40° C. above the MSST of the ethylene-unsaturated ester copolymer. In many applications, an acceptable upper end point of an extended HTP (by incorporation of the resin) will be the temperature equal to the temperature at which the ethylene unsaturated ester copolymer alone has decreased to a value equal to 70% of its MSST.

FIG. 9 illustrates this principle. In FIG. 9, the maximum value of the hot tack strength of the ethylene-unsaturated ester copolymer alone is indicated at point A. As illustration only, the point at which 60% of the maximum value the hot tack strength of the ethylene-unsaturated ester copolymer is indicated as point B and a horizontal dotted line is drawn through point B. The dotted line indicates the preferred minimum value of the hot tack strength of the ethylene-unsaturated ester copolymer-resin combination at temperatures greater than at least 10° C. above the MSST of the ethylene-unsaturated ester copolymer alone and up to the temperatures previously described.

As a result of the increased hot tack plateau, at temperatures greater than at least 10° C. above the MSST of the ethylene-unsaturated ester copolymer alone, the hot tack strength of the ethylene-unsaturated ester copolymer-resin combination is preferably greater than 55%, more preferably greater than 60%, more preferably greater than 65%, more preferably greater than 70%, more preferably greater than 75%, more preferably greater than 80%, and even more preferably greater than 85% of the maximum hot tack strength of the ethylene-unsaturated ester copolymer at temperatures. Thus, with reference to FIG. 9, if the preferred minimum hot tack strength is increased, the dotted line, while remaining horizontal, would therefore move upward in the direction of point A. FIG. 9 is used as a general illustration only. Suitable curves would need to be generated for each copolymer and copolymer-resin combination to determine suitable values.

FIG. 1 illustrates an extrusion coating embodiment where the sealing layer comprises 90 wt % ethylene vinyl acetate copolymer containing 18 wt % vinyl acetate and a 10 wt % thermally polymerized hydrogenated cyclopentadiene resin. As shown in FIG. 1, such an embodiment meets all three criteria previously discussed. The ethylene vinyl acetate copolymer-resin combination has increased hot tack strength at lower temperatures and greater maximum hot tack strength. Furthermore, FIG. 1 illustrates that the hot tack strength of the ethylene-unsaturated ester copolymer resin combination is greater than about 75% of the maximum hot tack strength of the ethylene-unsaturated ester copolymer alone at temperatures above 80° C., and greater than about 85% of the maximum hot tack strength of the ethylene-unsaturated ester copolymer alone at temperatures between about 110° C. and about 155° C. This allows a processor to obtain greater hot tack strength across a broader range of temperatures and allows a processor to form seals at temperatures where the processor would obtain only a fraction of the maximum hot tack strength otherwise obtainable by using the ethylene-unsaturated ester copolymer alone.

Figure 3:
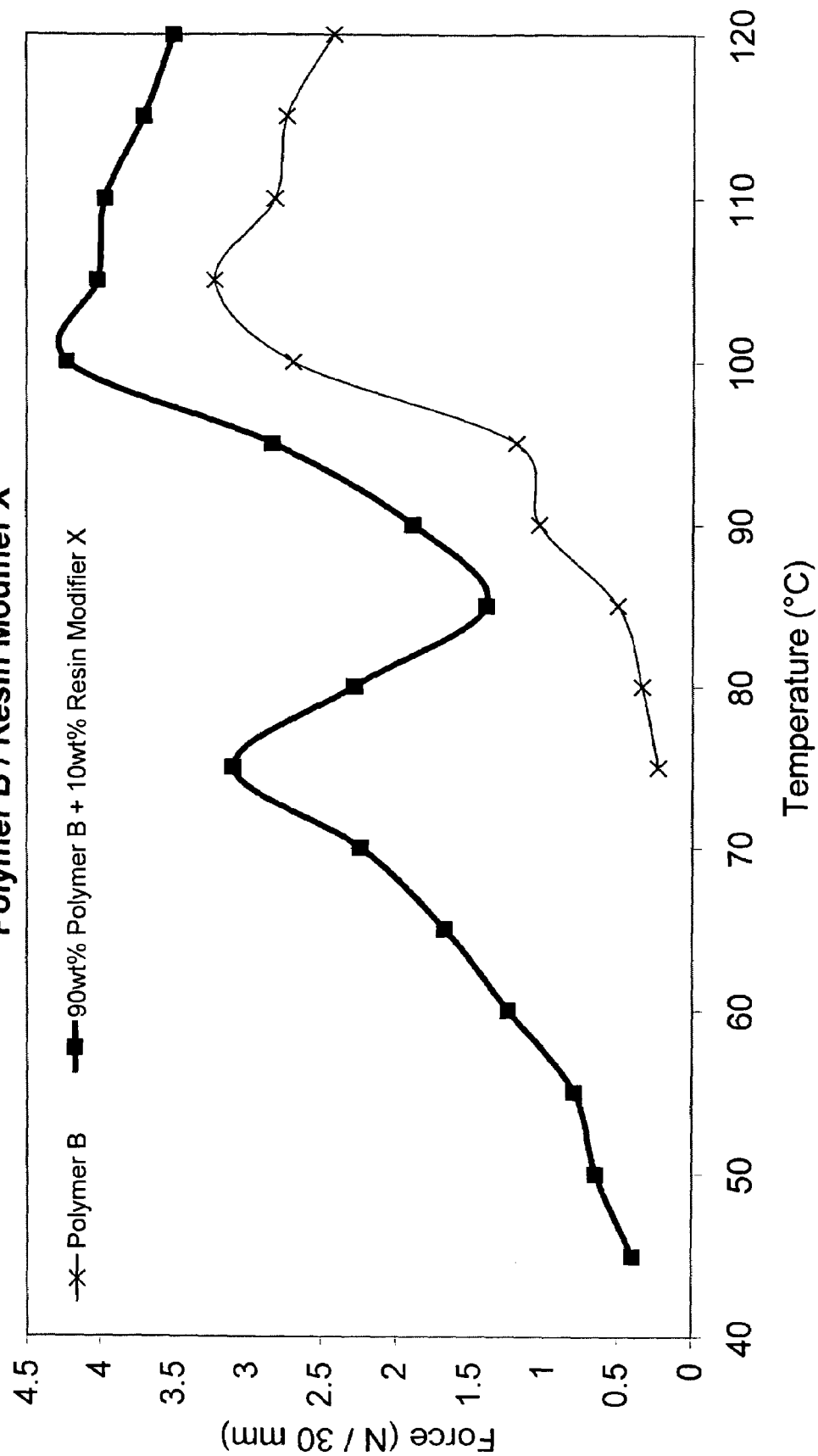
FIGS. 3-4 show a comparison of hot tack strength and seal strength in a film application between an ethylene-vinyl acetate copolymer containing 12 wt % vinyl acetate and a combination of 10 wt % resin and 90 wt % ethylene-vinyl acetate copolymer containing 12 wt % vinyl acetate.
Figure 4:
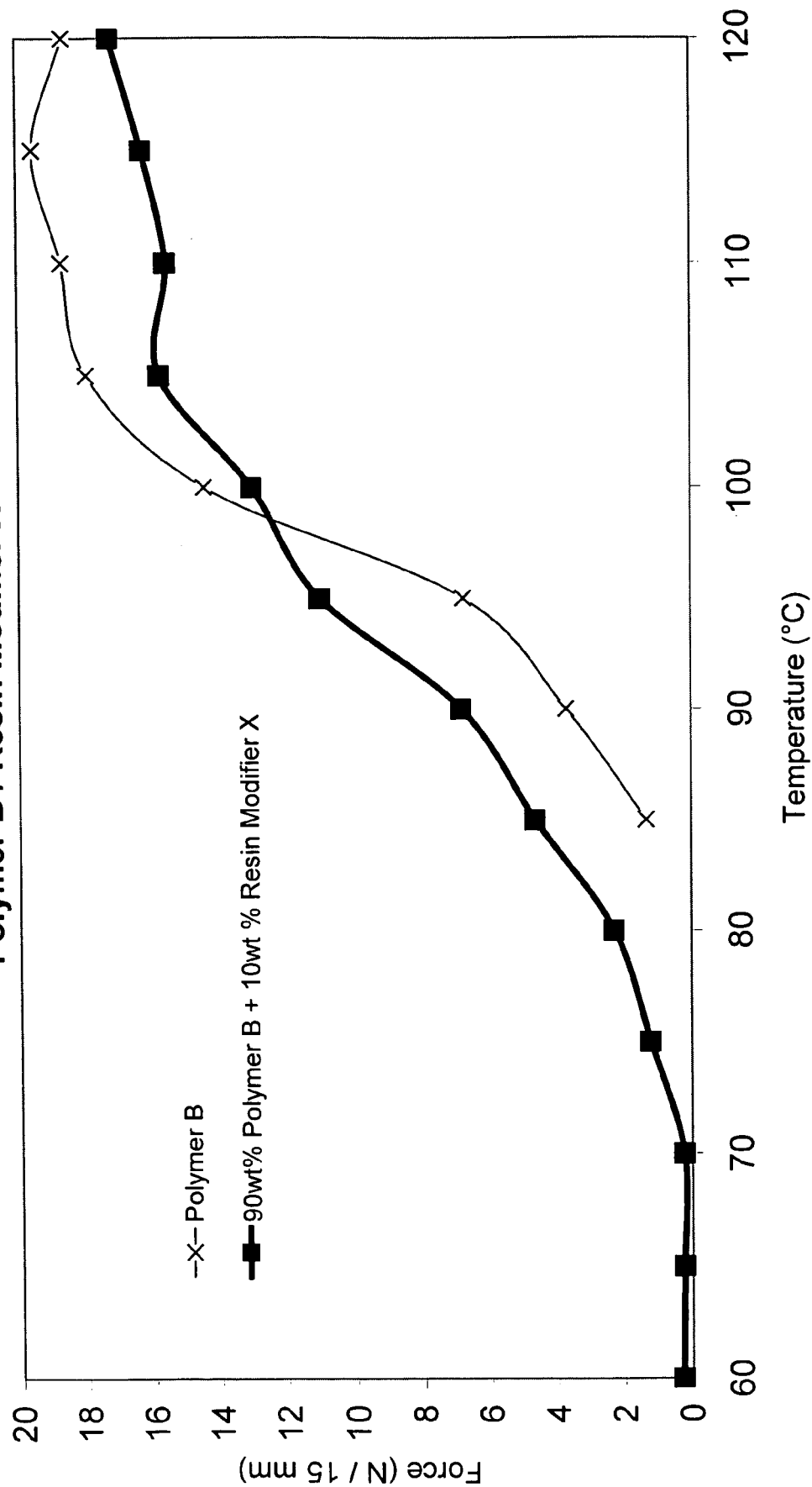

A film embodiment is illustrated in FIG. 3. The sealing layer comprises 90 wt % ethylene vinyl acetate copolymer containing 12 wt % vinyl acetate and a 10 wt % thermally polymerized hydrogenated cyclopentadiene resin, available as EMPR 104 available from ExxonMobil Chemical Company. As shown in FIG. 3, such an embodiment meets all three criteria. FIG. 4 illustrates that the seal strength properties are comparable and not adversely affected.

Figure 5:
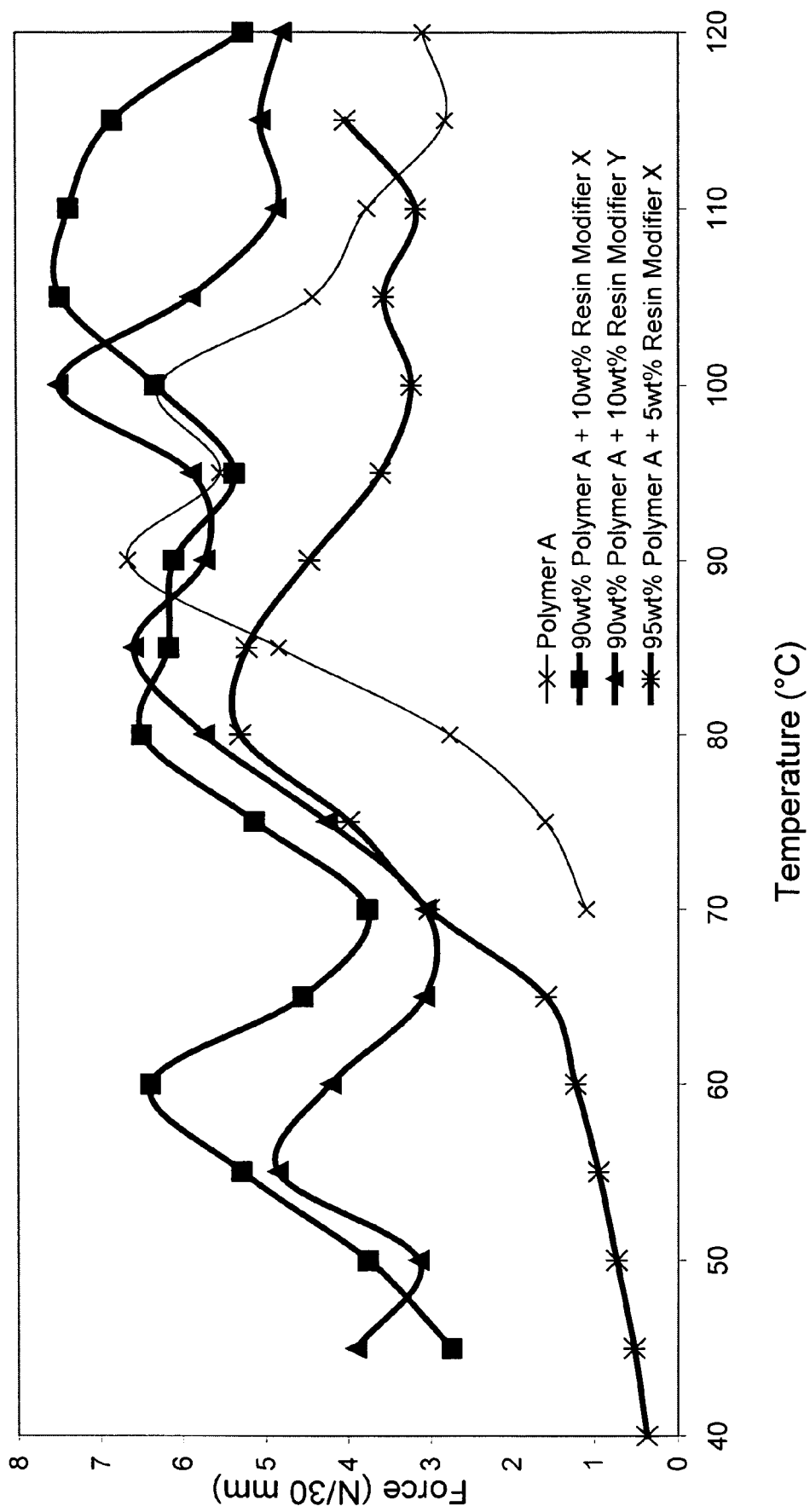
FIGS. 5-6 show a comparison of hot tack strength and seal strength in a film application between an ethylene-vinyl acetate copolymer containing 18 wt % vinyl acetate and a combination of various types and amounts of resins and an ethylene-vinyl acetate copolymer containing 18 wt % vinyl acetate.
Figure 6:
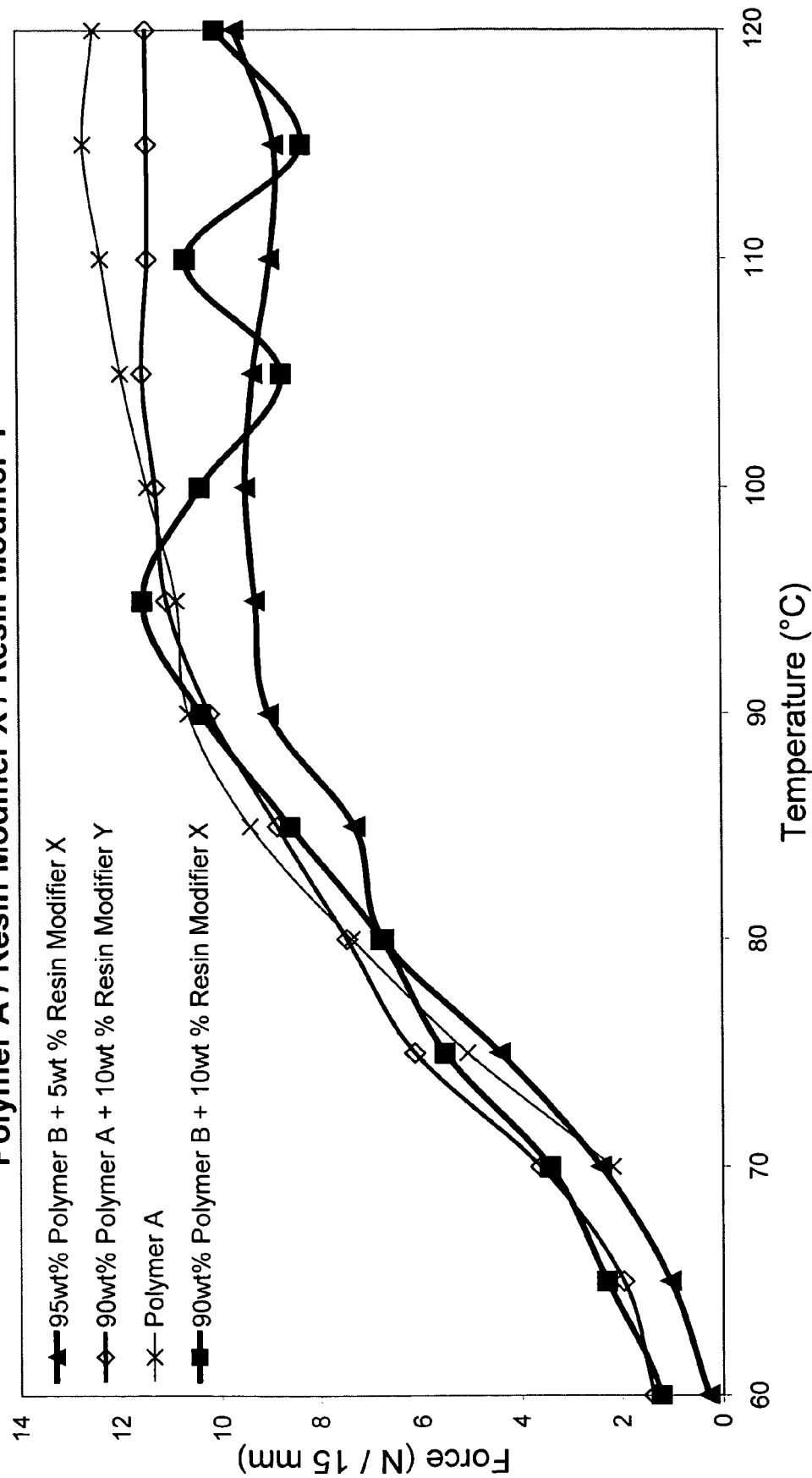

In one film embodiment, the sealing layer comprises 95 wt % ethylene vinyl acetate copolymer containing 14 wt % vinyl acetate and a 5 wt % thermally polymerized hydrogenated cyclopentadiene resin, available as EMPR 104, available from ExxonMobil Chemical Company. As shown in FIG. 5, such an embodiment has increased hot tack strength at lower temperatures, but exhibits an overall lower maximum hot tack strength. If the amount of resin is increased to 10 wt %, the combination meets all three criteria. FIG. 6 illustrates that the seal strength properties are comparable and not adversely affected.

In one film embodiment, the sealing layer comprises 90 wt % ethylene vinyl acetate copolymer containing 14 wt % vinyl acetate and a 10 wt % thermally polymerized hydrogenated aromatic-containing cyclopentadiene resin, available as EMPR 114, available from ExxonMobil Chemical Company. As shown in FIG. 5, such an embodiment meets all three criteria.

Figure 7:
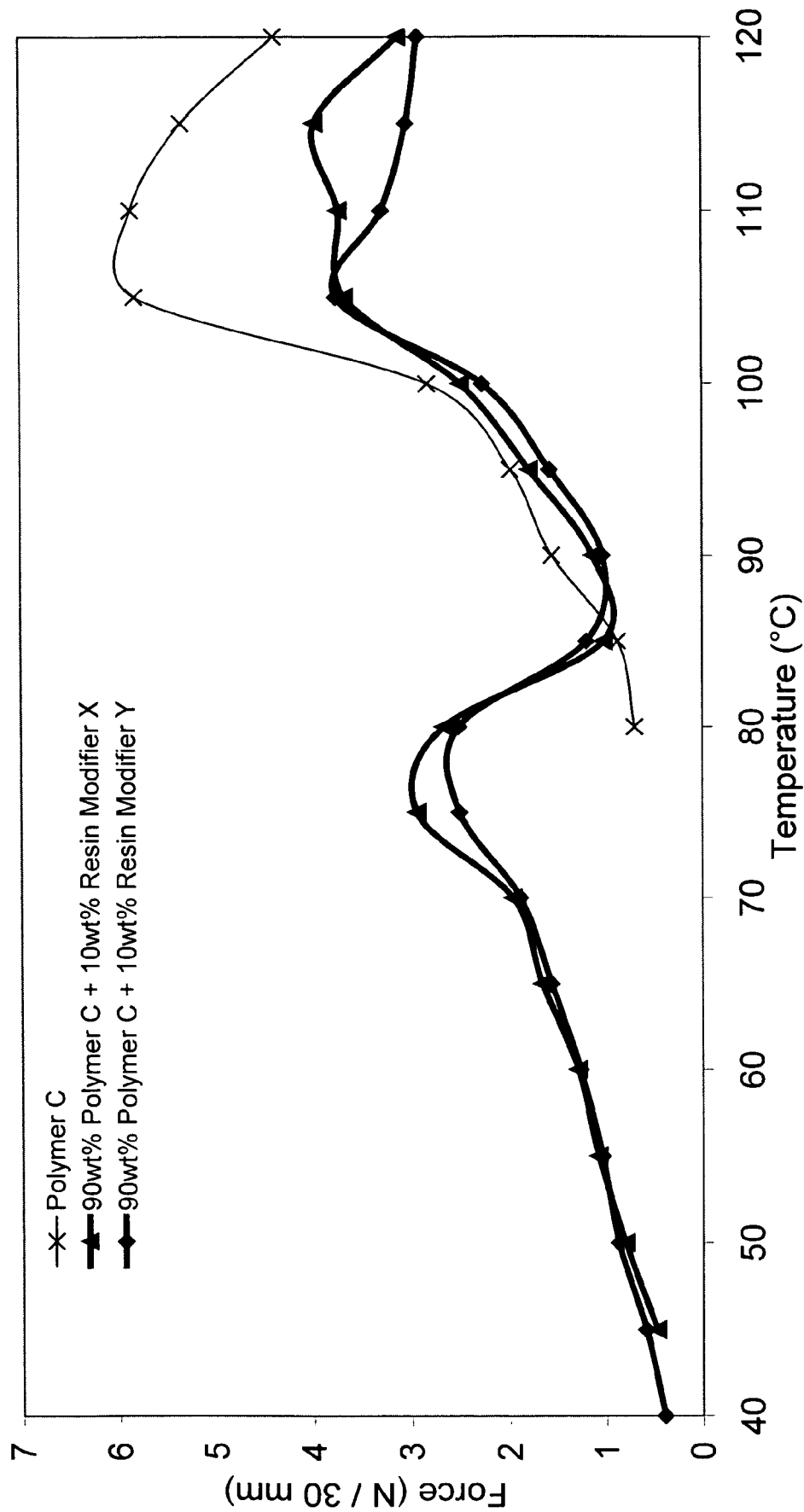
FIGS. 7-8 show a comparison of hot tack strength and seal strength in a film application between an ethylene-vinyl acetate copolymer containing 9 wt % vinyl acetate and a combination of various types and amounts of resins and an ethylene-vinyl acetate copolymer containing 9 wt % vinyl acetate.
Figure 8:
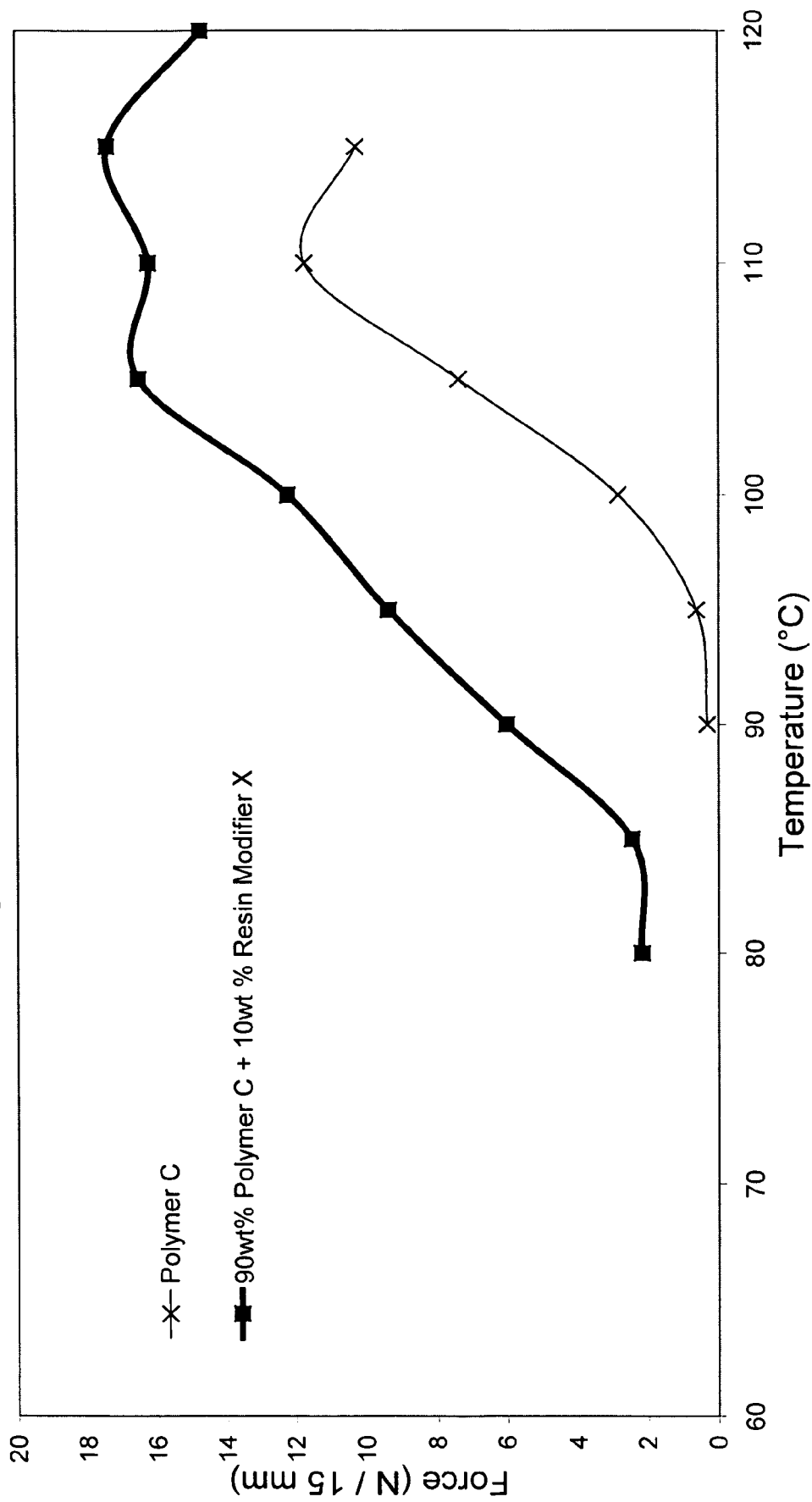

In one film embodiment, the sealing layer comprises 90 wt % ethylene vinyl acetate copolymer containing 9 wt % vinyl acetate and a 10 wt % thermally polymerized hydrogenated cyclopentadiene resin. As shown in FIG. 7, such an embodiment has increased hot tack strength at lower temperatures less than 85° C., but exhibits an overall lower maximum hot tack strength. The same appears to be true if the resin is changed to a thermally polymerized hydrogenated aromatic-containing cyclopentadiene resin. It is believed that an EVA with 9 wt % vinyl acetate content could be mixed with a more compatible resin and thereby achieve a greater maximum hot tack strength, thereby creating another embodiment that would meet all three criteria set forth above. FIG. 8 illustrates that the seal strength properties are comparable and not adversely affected when the thermally polymerized hydrogenated cyclopentadiene resin is used.

The heat sealable compositions for use in the sealing layer may be formed in any conventional manner, e.g. melt blending, dry blending, or on-line blending. In melt blending, the individual components where the polymers are first mixed and then extruded in a compounding extruder to obtain pellets that contain a combination of the materials. In dry blending, the components (preferably in pelletized form) are mixed together and then added directly to the extruder used to manufacture the film. Optionally, slip additives, anit-block additives, antioxidants, UV stabilizers, pigments, fillers and other processing aids may be incorporated in either the melt blends or dry blends.

Either of the methods above may be employed to form the heat sealable composition from a masterbatch containing the resin and a suitable carrier polymer such as the ethylene unsaturated ester copolymers described herein or other suitable carrier polymers (e.g, polyethylene). Such a masterbatch may then be added to additional ethylene unsaturated ester copolymer to form a heat sealable composition as described above. Suitable masterbatches can be produced by conventional methods such as compounding in a twin screw extruder, Banbury mixer, and other conventional methods known in the art. The masterbatch would generally contain resin in an amount between 10-90 wt %, more preferably 20-80 wt %, more preferably 30-70 wt %, more preferably 40-60 wt % and would contain ethylene unsaturated ester copolymer in an amount between 10-90 wt %, more preferably 20-80 wt %, more preferably 30-70 wt %, more preferably 40-60 wt %, and optionally up to 60 wt % additives as described herein.

Heat sealable films having the sealing layer compositions described above may be employed as either mono- or multi-layer films or laminates and may be manufactured by any conventional process, including simple bubble extrusion, biaxial orientation processes (such as tenter frames, trapped bubble, or double bubble processes), simple cast/sheet extrusion-lamination, co-extrusion, lamination, extrusion coating, and co-extrusion coating, blowing and casting, etc. Should a multilayer film be desired, such may be obtained from a monolayer blown or cast film that can be combined with the other layers though conventional techniques such as adhesive lamination or extrusion lamination. Monolayer and coextruded films can also be produced by biaxial orientation processes. Extrusion coating is another suitable process. A heat-sealable film comprising a sealing layer as described herein may be extrusion coated onto a substrate either in the form of a monolayer or a multi-layer co-extruded substrate. A multi-layer extrudate can be produced via multiple extruders on multi-station tandem lines. The sealing layer can be coextruded with other layer(s) of a multi-layer film or the sealing layer can be laminated onto another layer(s) or substrate, including paper, foil, oriented polypropylene, polyamides, polyesters, polyethylenes, polyethylene tereplithalate, metal and metallized substrates and other substrates discussed herein.

The film may be obtained by the flat film or tubular process which may be followed by orientation in an uniaxial direction or in two mutually perpendicular directions in the plane of the film. One or more of the layers of the film may be oriented in the transverse and/or longitudinal directions to the same or different extents. This orientation may occur before or after the individual layers are brought together. For example a polyethylene layer can be extrusion coated or laminated onto an oriented polypropylene or oriented polyester layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15 preferably 7 to 9. However, in another embodiment the film is oriented to the same extent in both the MD and TD directions.

In another embodiment the ethylene unsaturated ester-resin layer may be combined with one or more other layers.

The other layer(s) may be any layer typically included in multilayer film structures. The other layers preferably contain no cross-linked polyethylene. For example the other layer or layers may comprise:

Polyolefins

Preferred polyolefins include homopolymers or copolymers of $C_2$ to $C_{40}$ olefins, preferably $C_2$ to $C_{20}$ olefins, preferably a copolymer of an alpha-olefin and another olefin or α-olefin (ethylene is defined to be an α-olefin for purposes of this invention). Preferably homopolyethylene, homopolypropylene, propylene copolymerized with ethylene and/or butene, ethylene copolymerized with one or more of propylene, butene, hexene, octene and optional dienes. Preferred examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as for example, thermoplastic elastomers and rubber toughened plastics.

Polar Polymers

Preferred polar polymers include homopolymers and copolymers of esters, amides, ethers, acetates, anhydrides, copolymers of a $C_2$ to $C_{20}$ olefin, such as ethylene and/or propylene and/or butene with one or more polar monomers such as acetates, anhydrides, esters, alcohol, ether and or acrylics. Preferred examples include polyesters, polyamides, ethylene vinyl acetate copolymers, polycarbonates and polyvinyl chloride.

Anionic Polymers

Preferred anionic polymers include polymers or copolymers polystyrene, polyisobutylene, and polyisoprene and block copolymers comprising blocks (di, tri-, and/or tetra) thereof, which may or may not be hydrogenated.

Cationic Polymers

Preferred cationic polymers include polymers or copolymers of geminally disubstituted olefins, alpha-heteroatom olefins and/or styrenic monomers. Preferred geminally disubstituted olefins include isobutylene, isopentene, isoheptene, isohexane, isooctene, isodecene, and isododecene. Preferred α-heteroatom olefins include vinyl ether and vinyl carbazole, preferred styrenic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-α-methyl styrene.

Miscellaneous

Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbonded fibers, and non-wovens (particularly polypropylene spun bonded fibers or non-wovens), and substrates coated with inks, dyes, pigments, PVC and the like.

The films may vary in thickness depending on the intended application, however films of a thickness from 1 to 250 μm are usually suitable. Films intended for packaging are usually from 10 to 60 μm thick. In many cases, the sealing layer will have a thickness from 4 to 60 μm, more preferably between 5 and 60 μm, more preferably from 6 to 50 μm, more preferably from 8 to 50 μm, more preferably between 10 and 50 μm, and most preferably between 15 and 30 λm. Other suitable ranges may include from any endpoint to any other endpoint specified in this paragraph. There may be a sealing layer on both the inner and outer surfaces of the film or the sealing layer may be present on only the inner or the outer surface.

Additives such as cling agents, antiblock agents, antioxidants, slip additives, pigments, fillers, processing aids, UV stabilizers, neutralizers, lubricants, surfactants and/or nucleating agents may also be present in one or more than one layer in the films. Preferred additives include silicon dioxide, titanium dioxide, polydimethylsiloxane, talc, dyes, wax, calcium sterate, carbon black, low molecular weight resins and glass beads.

In one embodiment, the layers (preferably other than the ethylene unsaturated ester-resin layer) may comprise a crosslinking agent. Preferred crosslinking agents include alcohols, multiols, amines, diamines and/or triamines. Examples of crosslinking agents useful in this invention include polyamines such as ethylenediamine, diethylenetriamine, hexamethylenediamine, diethylaniinopropylamine, and/or menthanediamine.

Preferred antioxidants include phenolic antioxidants, such as Irganox 1010, Irganox, 1076 both available from Ciba-Geigy and 3,5 tertiary-butyl 4-hydroxy toluene. Preferred oils include paraffinic or napthenic oils such as Primol 352, or Primol 876 available from ExxonMobil Chemical France, S.A. in Paris, France. More preferred oils include aliphatic napthenic oils, white oils or the like.

Preferred plasticizers and/or adjuvants include mineral oils, polybutenes, phthalates and the like. Particularly preferred plasticizers include phthalates such as diisoundecyl phthalate (DIUP), diisononylphthalate (DINP), dioctylphthalates (DOP) and polybutenes, such as Parapol 950 and Parapol 1300 available from ExxonMobil Chemical Company in Houston Tex.

Preferred processing aids, lubricants, waxes, and/or oils include low molecular weight products such as wax, oil or low Mn polymer, (low meaning below Mn of 5000, preferably below 4000, more preferably below 3000, even more preferably below 2500). Preferred waxes include polar or non-polar waxes, functionalized waxes, polypropylene waxes, polyethylene waxes, and wax modifiers. Preferred waxes include ESCOMER 101. Preferred low Mn polymers include polymers of lower alpha olefins such as propylene, butene, pentene, hexene and the like. A particularly preferred polymer includes polybutene having an Mn of less than 1000. An example of such a polymer is available under the trade name PARAPOL 950 from Exxon Chemical Company. PARAPOL 950 is an liquid polybutene polymer having an Mn of 950 and a kinematic viscosity of 220 cSt at 100 C, as measured by ASTM D 445.

In another embodiment one more layers may be modified by corona treatment, electron beam irradiation, gamma irradiation, flame treatment or microwave. In a preferred embodiment one or both of the surface layers is modified by corona treatment.

The films described above may be used as stretch and/or cling films. Stretch/cling films are used in various bundling, packaging and palletizing operations. To impart cling properties to, or improve the cling properties of, a particular film, a number of well-known tackifying additives have been utilized. Common tackifying additives include polybutenes, terpene resins, and hydrogenated rosins and rosin esters. The cling properties of a film can also be modified by the well-known physical process referred to as corona discharge.

Some polymers (such as ethylene methyl acrylate copolymers) do not need cling additives and can be used as cling layers without tackifiers. Stretch/clings films may comprise a slip layer comprising any suitable polyolefin or combination of polyolefins such as polyethylene, polypropylene, copolymers of ethylene and propylene, and polymers obtained from ethylene and/or propylene copolymerized with minor amounts of other olefins, particularly $C_4$ to $C_{12}$ olefins. Particularly preferred are polypropylene and linear low density polyethylene (LLDPE). Suitable polypropylene is normally solid and isotactic, i.e., greater than 90% hot heptane insolubles, having wide ranging melt flow rates of from about 0.1 to about 300 g/10 min. Additionally, the slip layer may include one or more anticling (slip and/or antiblock) additives which may be added during the production of the polyolefin or subsequently blended in to improve the slip properties of this layer. Such additives are well-known in the art and include, for example, silicas, silicates, diatomaceous earths, talcs and various lubricants. These additives are preferably utilized in amounts ranging from about 100 ppm to about 20,000 ppm, more preferably between about 500 ppm to about 10,000 ppm, by weight based upon the weight of the slip layer. The slip layer may, if desired, also include one or more other additives as described above.

In some embodiments, the olefin copolymers described above preferably have a composition distribution breadth index (CDBI) of 50% or more, preferably above 60%, even more preferably above 70%. In one embodiment the CDBI is above 80%, even more preferably above 90%, even more preferably above 95%. In another particularly preferred embodiment, the polyethylene copolymer has a CDBI between 60 and 85%, even more preferably between 65 and 85%. Composition Distribution Breadth Index (CDBI) is a measure of the composition distribution of monomer within the polymer chains and is measured by the procedure described in PCT publication WO 93/03093, published Feb. 18, 1993 including that fractions having a weight average molecular weight (Mw) below 15,000 are ignored when determining CDBI. For purposes of this invention a homopolymer is defined to have a CDBI of 100%.

In a particularly preferred embodiment the ethylene homopolymer or copolymer has a CDBI of 65 to 85%, a density of 0.915 to 0.96 g/cm3 and a Mw/Mn between 1 and 2.5. In another preferred embodiment the ethylene homopolymer or copolymer has a density of 0.86 to 0.925 g/cm3 and a CDBI of over 80%, preferably between 80 and 99%.

In some embodiments, the polypropylene homopolymer or copolymer preferably has an MFR (melt flow rate) of 0.5 to 40 as measured according to ASTM D 1238 (230° C., 2.16 kg). In another embodiment the polypropylene homopolymer or copolymer preferably has a CDBI of 50% or more, preferably above 60%, even more preferably above 70%. Polypropylenes having a CDBI above 60% are available from Exxon Chemical Company in Baytown, Tex. under the tradename ACHIEVE.

In a preferred embodiment the polyethylene homopolymers and copolymers described above are metallocene polyethylenes (mPE's) or metallocene polypropylenes (mPP's). The usage of the term polyethylene herein is defined to include metallocene polyethylenes and the usage of the term polypropylene herein is defined to include metallocene polypropyleness. The mPE and or mPP homopolymers or copolymers are typically produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/activator combinations are commercially available from Exxon Chemical Company in Baytown Tex. under the tradenames EXCEED, ACHIEVE and EXACT.

For more information on the methods and catalysts/activators to produce such mPE and or mPP homopolymers and copolymers see WO 94/26816; WO 94/03506; EPA 277,003; EPA 277,004; U.S. Pat. No. 5,153,157; U.S. Pat. No. 5,198,401; U.S. Pat. No. 5,240,894; U.S. Pat. No. 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; U.S. Pat. No. 5,507,475; EPA 426 637; EPA 573 403; EPA 520 732; EPA 495 375; EPA 500 944; EPA 570 982; WO91/09882; WO94/03506 and U.S. Pat. No. 5,055,438.

A heat sealed article may be formed by pressing at least two portions of the film or laminate together at a temperature sufficient to soften at least one of the sealing layers of the film or laminate portions. Preferably, at least a portion of the sealing layer is sealed against at least one other portion of a corresponding sealing layer containing the same ethylene-unsaturated ester copolymer and resin combination or against the substrate to which it is being sealed, for example printed paper. The laminate or film sealing layer portion that has been softened by heat is preferably formed from ethylene-unsaturated ester copolymer and resin combination. Although it is sufficient if only one of the film or laminate portions being heated and pressed to form a heat seal comprises the ethylene-unsaturated ester copolymer and resin combination, it is preferable for all article portions directly involved in the heat seal to be formed from the ethylene-unsaturated ester copolymer and resin combination.

The heat sealing temperatures must be high enough to soften the sealing layer combination of ethylene-unsaturated ester copolymer and resin so that it will adhere to the material to which it is being sealed, i.e., above the SIT of the ethylene-unsaturated ester copolymer and resin combination.

The seals are preferably formed by heating one or both of the laminate portions to the necessary temperature, pressing the portions together for a time sufficient to cause them to at least partially set together, and then cooling the seal. The pressure needed to join the portions will depend on the shape, thickness, and exact composition of the layers to be laminated or sealed and the temperature at which the seal is made. In some instances, the ethylene-unsaturated ester copolymer and resin combination may preferably be used only in the areas where the heat seal will be formed.

In one embodiment, the heat sealed article formed may preferably be a sealed container or other article comprising a body or substrate and a sealing member secured thereto, wherein the sealing member comprises a sealing layer described herein. The body or substrate may be constructed of any of a number of different materials such as paper, plastic, glass, ceramics, metal, and textiles. The body can be constructed with walls that are impervious to liquids and/or gasses or the body may be constructed to allow the passage of liquids and/or gasses. The body may also be constructed with one or more portals to allow passage of small items through the body wall or to allow the consumer to inspect the item stored in the container without removing the item from the container.

End Uses

The heat-sealable films and laminates described herein can be used in variety of applications including containers for consumer and other applications, films, bags, laminated paper, board and plastic, picture and identification card lamination and encapsulation, and other applications.

Properties

The properties referred to herein are measured according to the following:

Melt Index (g/10 min) was measured according to ASTM D 1238, condition E, 190° C., 2.16 kg mass.

Softening Point (° C.) was preferably measured as a ring and ball softening point according to ASTM E-28 (Revision 1996).

Molecular weights (number average molecular weight (Mn), weight average molecular weight (Mw), and z-average molecular weight (Mz), g/mol) were measured by Size Exclusion Chromatography using a Waters 150 Gel Permeation Chromatograph equipped with a differential refractive index detector and calibrated using polystyrene standards.

Glass transition temperature, Tg (° C.), was measured using Differential Scanning Calorimetry (DSC, ASTM E-1356, at a heating rate of 5° C./minute).

Static and kinetic coefficients of friction were determined by ASTM D-1894.

Hot tack strength (N/30 mm) testing was conducted on a J&B hot tack strength instrument supplied by J & B Instruments. The testing conditions were: 30 mm wide strips, 0.5 N/mm$^2$ seal pressure, 0.5 second seal time, 50 mm seal bar length, 5 mm seal bar, and 200 mm/second peel speed. Hot tack strength was measured after 0.4 seconds cool time, and delayed hot tack strength was measured after 10 seconds cool time. Four test specimens were measured each temperature point and the average hot tack strength was recorded for each temperature point to generate the hot tack strength curve.

Seal Strength (N/15 mm) was tested according to the following procedure. The seals were made as described for the measurement of hot tack strength, but after the seals were made, the specimens were cut into 15 mm strips. After conditioning for a minimum of 12 hours at 23° C.±3° C. and 50% humidity±5% humidity, the seal strength of 15 mm wide sample was measured in a Zwick tensile instrument under the following conditions:

| Speed | 100 mm/min for extrusion coated surfaces |
| --- | --- |
|  | 500 mm/min for film samples |
| Load Cell | 200 N |
| Clamp Distance | 50 mm |

The film or extrusion coated surface produced was placed between two clamps, and the clamps were moved apart at the speeds indicated. The sealing force was recorded as a function of elongation (%). Four test specimens were measured each temperature point and the average seal strength was recorded for each temperature point to generate the seal strength curve. The seal strength was the force at which the test specimen failed.

Materials

Polymer A was an ethylene-vinyl acetate copolymer having a vinyl acetate content of 18 wt % and a melt index of 14 and is available from ExxonMobil Chemical Company as Escorene® Ultra EVA Copolymer FL01418. The melt index for polymer A was correlated from melt flow rate measurements at 190° C. according to the following: log(melt index)=0.9394+0.9174*(log(melt flow rate)).

Polymer B was an ethylene-vinyl acetate copolymer having a vinyl acetate content of 12 wt % and a melt index of 0.5 and is available from ExxonMobil Chemical Company as Escorene® Ultra EVA Copolymer FL00112.

Polymer C was an ethylene-vinyl acetate copolymer having a vinyl acetate content of 9 wt % and a melt index of 0.5 and is available from ExxonMobil Chemical Company as Escorene® Ultra EVA Copolymer UL00109.

Resin X was a thermally polymerized hydrogenated cyclopentadiene hydrocarbon resin having a softening point of 120° C., a glass transition temperature of 70° C. and a molecular weight (Mn) of 360, available from ExxonMobil Chemical Company as EMPR 104.

Resin Y was a thermally polymerized hydrogenated aromatic-containing cyclopentadiene hydrocarbon resin having a softening point of 118° C., a glass transition temperature of 70° C. and a molecular weight (Mn) of 320, available from ExxonMobil Chemical Company as EMPR 111.

EXAMPLES

Example 1

A blend of 90 wt % polymer A and 10 wt % resin X were processed on a pilot extrusion coating line at a set temperature of 240° C. The blend was coated onto a 70 g/m$^2$ kraft paper at a coating weight of 25 gsm and a line speed of 50 m/minute using mat chill roll finishing. The kraft paper substrate was corona pretreated and the ethylene-unsaturated ester copolymer and resin combination was ozone treated.

Comparative Example 1A

Figure 2:
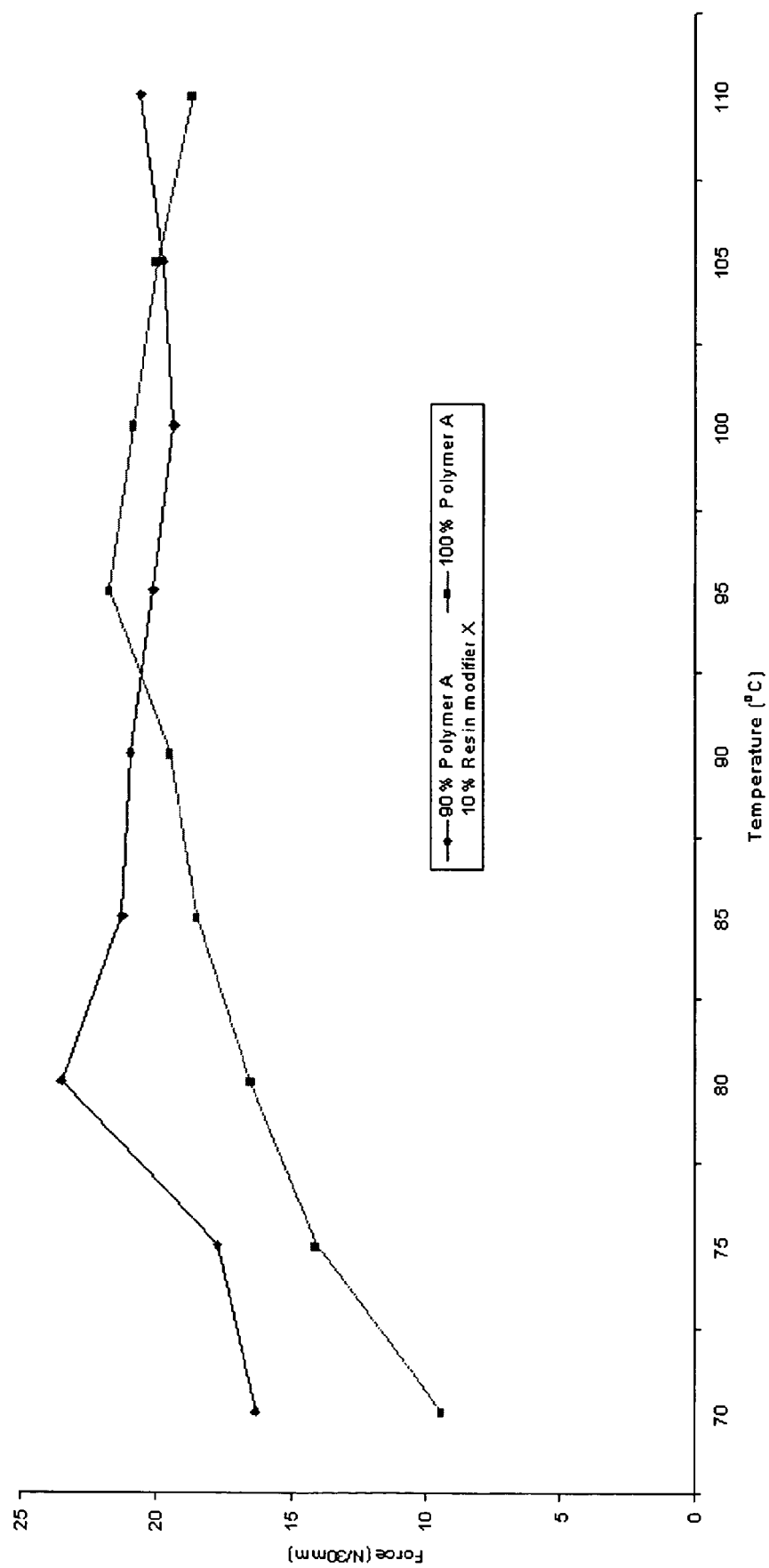

The same process as for example 1 was conducted processing only Polymer A. The results from Examples 1 and 1A are shown in FIGS. 1 and 2. Adhesion and coefficients of friction for the laminates from Example 1 and Comparative Example 1A were also tested and shown in Table 1.

TABLE 1

|  | Example Number | |
| --- | --- | --- |
|  | 1 | 1A |
| Components |  |  |
| Polymer A | 90 wt % | 100 wt % |
| Resin X | 10 wt % | 0 |
| Adhesion Coating Efficiency | 87% | 78% |
| Adhesion Visual Inspection | no failures | all failures |
| Static COF | 0.96 | 0.84 |
| Kinetic COF | 0.96 | 0.58 |

Although the COFs are slightly higher, they are still within an acceptable operating range.

Examples 2-7

Examples 2-7 illustrate examples of films. The ethylene-unsaturated ester copolymer-resin combinations (wt % based on weight of combination) were dry blended and extruded on a laboratory cast line to make 100 micron monolayer films under the following conditions:

| Example | Polymer | Resin | Take off line speed (m/min) | Set Temperature (° C.) |
| --- | --- | --- | --- | --- |
| 2 | 90% A | 10% X | 4.4 | 180 |
| 3 | 95% A | 5% X | 4.4 | 180 |

-continued

| Example | Polymer | Resin | Take off line speed (m/min) | Set Temperature (° C.) |
|---|---|---|---|---|
| 4 | 90% A | 10% Y | 4.2 | 220 |
| 5 | 90% B | 10% X | 4.2 | 220 |
| 6 | 90% C | 10% Y | 4.2 | 220 |
| 7 | 90% C | 10% X | 4.1 | 220 |

The films produced in Examples 2-7 were then subjected to hot tack strength testing and seal strength testing, yielding the results shown in FIGS. 3-8. These Figures illustrate that the addition of the resin to the polymer improves hot tack, significantly broadens the hot tack plateau, and yields a lower initial sealing temperature. These Figures also illustrate that the seal strength properties are comparable to seal strengths obtained by the corresponding films made from the polymer alone.

We claim:

1. A sealing layer composition consisting essentially of:
from 75 to 99 wt %, based upon the weight of the sealing layer composition, of an ethylene-unsaturated ester copolymer having a melt index of 35 g/10 min or less, and
from 5 to 20 wt % of a high softening point resin selected from the group consisting of aliphatic hydrocarbon resins, hydrogenated aliphatic hydrocarbon resins, aliphatic/aromatic hydrocarbon resins, hydrogenated aliphatic/aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, aromatic hydrocarbon resins, hydrogenated aromatic hydrocarbon resins, grafted resins, and combinations thereof, the resin having a softening point of 110 to 180° C.,
wherein during a heat sealing process the maximum hot tack of the sealing layer composition is greater than the maximum hot tack of the ethylene-unsaturated ester copolymer alone and the sealing layer composition sealing temperature is at least 10° C. below the sealing temperature of the ethylene-unsaturated ester copolymer alone for a predetermined hot tack value.

2. The sealing layer composition according to claim 1, wherein at temperatures greater than 10° C. above the MSST of the ethylene-unsaturated ester copolymer alone, the hot tack strength of the sealing layer is greater than 50% of the value of the maximum hot tack strength of the ethylene-unsaturated ester copolymer alone.

3. The sealing layer composition according to claim 1 consisting essentially of:
   (a) from 80 to 99 wt % ethylene unsaturated ester copolymer and the ethylene unsaturated ester copolymer is an ethylene vinyl acetate copolymer having greater than 5 wt % vinyl acetate; and
   (b) from 5 to 20 wt % of resin selected from the group consisting of: aliphatic/aromatic hydrocarbon resins, hydrogenated aliphatic/aromatic hydrocarbon resins, cycloaliphatic/aromatic hydrocarbon resins, hydrogenated cycloaliphatic/aromatic hydrocarbon resins, aromatic hydrocarbon resins, hydrogenated aromatic hydrocarbon resins, grafted resins, and mixtures of any two or more thereof.

4. The sealing layer composition according to claim 1, wherein the high softening point resin is a partially hydrogenated aromatic hydrocarbon resin having an aromatic content of 1 to 60%.

5. The sealing layer composition according to claim 1, wherein the high softening point resin has a softening point of 120 to 180° C.

6. The sealing layer composition according to claim 1, wherein the high softening point resin has a softening point of 130 to 180° C.

7. The sealing layer composition according to claim 1, where the heat seal strength is at least 5 N/15 mm when measured at 85° C.

8. The sealing layer composition according to claim 1, where the heat seal strength is at least 11 N/15 mm when measured at 95° C.

9. The sealing layer composition according to claim 1, where the heat seal strength is at least 13 N/15 mm when measured at 100° C.

* * * * *